(12) United States Patent
Renalds

(10) Patent No.: US 12,154,171 B2
(45) Date of Patent: *Nov. 26, 2024

(54) SYSTEM AND METHOD FOR ACTIVE ORDER MANAGEMENT IN AN ELECTRONIC TRADING ENVIRONMENT

(71) Applicant: TRADING TECHNOLOGIES INTERNATIONAL INC., Chicago, IL (US)

(72) Inventor: Andrew Theodore Renalds, Chicago, IL (US)

(73) Assignee: Trading Technologies International, Inc., Chicago, IL (US)

( * ) Notice: Subject to any disclaimer, the term of this patent is extended or adjusted under 35 U.S.C. 154(b) by 18 days.

This patent is subject to a terminal disclaimer.

(21) Appl. No.: 18/156,501

(22) Filed: Jan. 19, 2023

(65) Prior Publication Data

US 2023/0153910 A1 May 18, 2023

Related U.S. Application Data

(63) Continuation of application No. 17/358,940, filed on Jun. 25, 2021, now Pat. No. 11,587,167, which is a
(Continued)

(51) Int. Cl.
*G06Q 40/00* (2023.01)
*G06Q 40/04* (2012.01)

(52) U.S. Cl.
CPC .................................. *G06Q 40/04* (2013.01)

(58) Field of Classification Search
CPC .................................................... G06Q 40/04
See application file for complete search history.

(56) References Cited

U.S. PATENT DOCUMENTS 6,418,419 B1 7/2002 Nieboer et al.
6,772,132 B1 8/2004 Kemp, II et al.
(Continued)

FOREIGN PATENT DOCUMENTS

| EP | 1049037 A2 | 11/2000 |
|---|---|---|
| WO | 2004/070564 A2 | 8/2004 |
| WO | 2005/089180 A2 | 9/2005 |

OTHER PUBLICATIONS

Wikipedia (Good 'Til Cancelled, https://web.archive.org/web/20150401200921/https://en.wikipedia.org/wiki/Good_'til_cancelled, Apr. 1, 2015) (Year: 2015).*
(Continued)

*Primary Examiner* — Elizabeth H Rosen
*Assistant Examiner* — Mark H Gaw
(74) *Attorney, Agent, or Firm* — McDonnell Boehnen Hulbert & Berghoff LLP

(57) ABSTRACT

A trade order may be submitted to an electronic exchange and updated, according to pay-up parameter values, in an attempt to receive a complete fill within a period of time. The trade order may comprise an order price and an order quantity when submitted to the electronic exchange. The pay-up parameters may include a pay-up interval, a pay-up amount, a pay-up counter, or a combination thereof. The price of the trade order may continue to be updated after the expiration of pay-up interval in an attempt to receive a complete fill of the trade order. The price of the trade order may be increased or decreased by the pay-up amount. The trade order may continue to be updated until a complete fill is received, the pay-up counter expires, and/or an ending time expires for which the pay-up parameters may be implemented.

8 Claims, 14 Drawing Sheets

Related U.S. Application Data continuation of application No. 16/540,585, filed on Aug. 14, 2019, now Pat. No. 11,138,662, which is a continuation of application No. 15/416,796, filed on Jan. 26, 2017, now Pat. No. 10,424,018.

(56) References Cited

U.S. PATENT DOCUMENTS

| | | | |
|---|---|---|---|
| 6,938,011 B1 | 8/2005 | Kemp, II et al. | |
| 7,127,424 B2 | 10/2006 | Kemp, II et al. | |
| 7,155,410 B1 | 12/2006 | Woodmansey et al. | |
| 7,243,083 B2 | 7/2007 | Burns et al. | |
| 7,299,208 B1 | 11/2007 | Bailon et al. | |
| 7,363,272 B1* | 4/2008 | Braig | G06Q 50/20 |
| | | | 705/37 |
| 7,389,268 B1 | 6/2008 | Kemp, II et al. | |
| 7,412,415 B2 | 8/2008 | Waddell | |
| 7,437,325 B2 | 10/2008 | Kemp, II et al. | |
| 7,584,140 B2 | 9/2009 | Brady et al. | |
| 7,596,528 B1 | 9/2009 | Herz | |
| 7,831,505 B2 | 11/2010 | Herz | |
| 7,904,380 B2 | 3/2011 | Herz | |
| 8,019,676 B2 | 9/2011 | Herz | |
| 8,175,960 B2 | 5/2012 | Herz | |
| 8,359,262 B2 | 1/2013 | Herz | |
| 8,606,689 B2 | 12/2013 | Herz | |
| 8,751,368 B2 | 6/2014 | Herz | |
| 9,727,916 B1* | 8/2017 | Montesano | G06Q 40/08 |
| 9,830,645 B2 | 11/2017 | Peterffy | |
| 10,115,159 B2 | 10/2018 | Herz | |
| 10,424,018 B2 | 9/2019 | Renalds | |
| 2003/0004852 A1 | 1/2003 | Burns | |
| 2003/0009411 A1 | 1/2003 | Ram et al. | |
| 2003/0088495 A1 | 5/2003 | Gilbert et al. | |
| 2003/0130929 A1 | 7/2003 | Waddell | |
| 2003/0154152 A1 | 8/2003 | Gilbert et al. | |
| 2003/0200167 A1 | 10/2003 | Kemp, II et al. | |
| 2003/0236737 A1 | 12/2003 | Kemp, II et al. | |
| 2004/0236637 A1 | 11/2004 | Tatge et al. | |
| 2005/0119964 A1 | 6/2005 | Brady et al. | |
| 2007/0038550 A1 | 2/2007 | Caille et al. | |
| 2009/0319418 A1 | 12/2009 | Herz | |
| 2010/0082500 A1* | 4/2010 | Lutnick | G06Q 40/04 |
| | | | 705/37 |
| 2011/0022510 A1 | 1/2011 | Herz | |
| 2011/0119175 A1 | 5/2011 | Herz | |
| 2011/0288986 A1 | 11/2011 | Herz | |
| 2012/0185374 A1 | 7/2012 | Herz | |
| 2013/0097068 A1 | 4/2013 | Herz | |
| 2013/0097069 A1 | 4/2013 | Herz | |
| 2013/0238479 A1 | 9/2013 | Baker et al. | |
| 2013/0246241 A1 | 9/2013 | Baker et al. | |
| 2014/0058922 A1 | 2/2014 | Herz | |
| 2015/0186995 A1 | 7/2015 | Renalds et al. | |
| 2017/0004576 A1* | 1/2017 | Cicero | G06Q 40/04 |
| 2018/0211314 A1 | 7/2018 | Renalds | |
| 2019/0005581 A1 | 1/2019 | Herz | |
| 2019/0370899 A1 | 12/2019 | Renalds | |

OTHER PUBLICATIONS

Bourghelle, D. and F. Declerck, "Why Markets Should Not Necessarily Reduce Tick Size," Center de Recherche en Gestion, Cahier de Recherche No. 2002-155, Oct. 2002, pp. 1-44.

COG Inc.: CQG Integrated Client Trading User Guide, Nov. 14, 2012, Version 13.5, pp. 1-317.

"Conditional Formatting" Webpage [online], Pearson Software Consulting, LLC, Feb. 9, 2002, pp. 1-4. Retrieved on Dec. 21, 2011] from the Internet, Wayback Machine archive: http://web.archive.org/Web/20020209220807/http://cpearson.com/excel/cformatting.htm.

Gwilym, O., et al., "Extreme Price Clustering in the London Equity Index Futures and Options Markets," Journal of Banking & Finance, 22, 1998, pp. 1193-1206.

Huang, et al., "Tick Size, Bid-Ask Spreads and Market Structure," Sep. 7, 2000, pp. 1-32.

Loistl, O., et al., "Tick Size and Spreads: The Case of Nasdaq's Decimalization," European Journal of Operational Research, vol. 155, 2004, pp. 317-334.

Taiwan Stock Exchange: Fact Book, Trading Process, 2003, pp. 29-37.

UCLA Academic Technology Services, "Introduction to SAS Macro Language," Statistical Computing Seminars, Jun. 18, 2004, pp. 1-12. [Retrieved on Dec. 21, 2011] from the Internet, Wayback Machine archive: http://web.archive.org/web/20040618233716/http://ats.ucla.edu/stat/sas/seminars/sas_macros_introductions/default.htm.

Yague, J. and Gomez-Sala, J.C., "Price and Tick Size Preferences in Trading Activity Changes Around Stock Split Executions," Spanish Economic Review, 7, 2005, pp. 111-138.

Trading Technologies International, Inc., "Autospreader—A Powerful Spreading Tool for X-Trader®Pro," 2005-2009, pp. 1-2.

Bollen et al., "Common Cents? Tick Size, Trading Costs, and Mutual Fund Performance," 2002-2003, pp. 1-55.

* cited by examiner

SYSTEM AND METHOD FOR ACTIVE ORDER MANAGEMENT IN AN ELECTRONIC TRADING ENVIRONMENT

CROSS REFERENCE TO RELATED APPLICATIONS

This application is a continuation of U.S. patent application Ser. No. 17/358,940 filed Jun. 25, 2021, now U.S. Pat. No. 11,587,167, which is a continuation of U.S. patent application Ser. No. 16/540,585 filed Aug. 14, 2019, now U.S. Pat. No. 11,138,662, which is a continuation of U.S. patent application Ser. No. 15/416,796 filed Jan. 26, 2017, now U.S. Pat. No. 10,424,018, the contents of each of which are fully incorporated herein by reference for all purposes.

BACKGROUND

An electronic trading system generally includes a trading device in communication with an electronic exchange. The trading device receives information about a market, such as prices and quantities, from the electronic exchange. The electronic exchange receives messages, such as messages related to orders, from the trading device. The electronic exchange attempts to match quantity of an order with quantity of one or more contra-side orders.

Users of trading devices may have trade orders working at the electronic exchange, for which the users would like to have a complete fill of the quantity of the order within a defined period of time. For example, the user may wish to receive a complete fill by the close of the market on a given day. Current trading systems allow a user to manually change the price value of the trade order to meet the market price at which the trade order can receive an immediate fill. However, the user may have some time until the user would like to have the order filled. By immediately increasing or decreasing the price of a working order, the user may be settling for a fill price having less value than a future fill price if the market were allowed to move toward the resting value of the working order.

Current trading systems provide and/or require time consuming and inefficient mechanisms to adjust the parameters of a working order. In quickly changing markets, the time spent by the user monitoring and adjusting the parameters of a working order may cause the user to miss out on trading opportunities or find themselves in an undesirable trading position.

BRIEF DESCRIPTION OF THE FIGURES

Certain embodiments are disclosed with reference to the following drawings.

Figure 1:
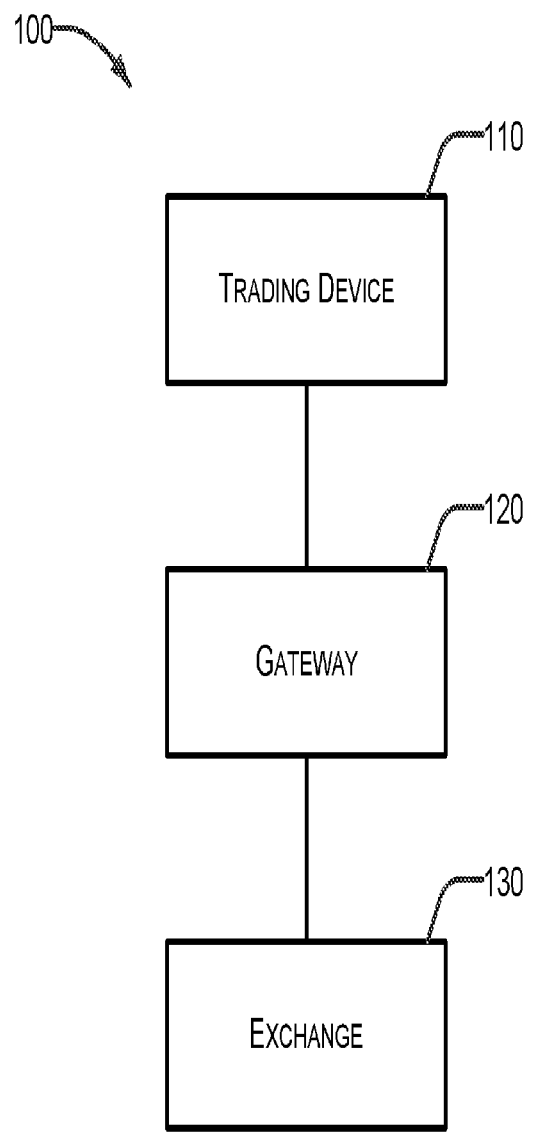
FIG. 1 illustrates a block diagram representative of an example electronic trading system in which certain embodiments may be employed.

Certain embodiments will be better understood when read in conjunction with the provided figures, which illustrate examples. It should be understood, however, that the embodiments are not limited to the arrangements and instrumentality shown in the attached figures.

DETAILED DESCRIPTION

Systems, methods, and apparatus are described herein for facilitating trading of at least one tradeable object in an electronic exchange. For example, a trade order may be submitted to an electronic exchange and updated, according to pay-up parameter values, in an attempt to receive a complete fill within a certain period of time. The trade order may comprise an order price and an order quantity when submitted to the electronic exchange. The price of the trade order may continue to be updated (e.g., increased or decreased toward the market) after the expiration of a time interval in an attempt to receive a complete fill of the trade order, while attempting to mitigate the loss associated with immediately receiving a complete fill. This may allow a trade order to slowly drift closer to the market over time to have an opportunity for better value fills.

The pay-up parameters may include a pay-up interval, a pay-up amount, a pay-up counter, or a combination thereof. The pay-up interval may indicate a time interval to wait prior to an increase or decrease in the order price when at least a portion of the order quantity is unfilled at the electronic exchange. In certain embodiments, the pay-up interval represents: a static increase or decrease that may be implemented when a predefined condition or event is detected; a static increase or decrease that may be implemented according to a schedule; and/or a dynamic change based on market conditions. The market conditions utilized to determine a dynamic change may, for example, take into account historical data to calculate a current change. For example, in certain embodiments the pay-up interval may be determined based on a comparison of historical volatility to current volatility in order to estimate how fast (and how much) the current market could change. The pay-up amount may indicate an amount to increase or decrease the order price after each interval that lapses without receiving a complete fill of the order quantity. The pay-up counter may indicate a number of times to change the order price to attempt to receive the complete fill of the order quantity. Additional details and descriptions of pay-up parameters and how they may be implemented are disclosed in commonly-assigned U.S. Pat. No. 7,596,528, entitled "System and Method for Dynamically Regulating Order Entry in an Electronic Trading Environment," the content of which is incorporated herein in its entirety for all purposes.

A synthetic strategy engine may receive values for the pay-up parameters and update the trade order according to the defined values. The synthetic strategy engine may determine an ending time by which the trade order is to be filled and continue to update the price of the trade order according to the defined pay-up amount at the expiration of the pay-up interval. The updates may continue until the value of the pay-up counter and/or an ending time has elapsed. In another example, the synthetic strategy engine may begin implementing the values of the pay-up parameters at the expiration of the ending time.

The trade order may define a parent order that has been sliced into multiple child orders, each of which may be submitted at different times. The child orders may be submitted to the electronic exchange at time slicer intervals. The order quantity of the child order may be a portion of a total order quantity for the parent order. The pay-up parameters may be implemented for each child order independently.

Although this description discloses embodiments including, among other components, software executed on hardware, it should be noted that the embodiments are merely illustrative and should not be considered as limiting. Accordingly, certain embodiments may be implemented in other ways.

BRIEF DESCRIPTION OF CERTAIN EMBODIMENTS

Systems, methods, and apparatus are described herein for facilitating trading at least one tradeable object in an electronic exchange. A trading interface may be provided for display at a trading device that comprises a plurality of pay-up parameters associated with a trade order. The trade order may comprise an order price and/or an order quantity. The plurality of pay-up parameters may comprise a pay-up interval that indicates a time interval to wait prior to an increase or decrease in the order price when at least a portion of the order quantity is unfilled at the electronic exchange. The plurality of pay-up parameters may comprise a pay-up amount that indicates an amount to increase or decrease the order price after each interval that lapses without receiving a complete fill of the order quantity. The plurality of pay-up parameters may comprise a pay-up counter that indicates a number of times to change the order price to attempt to receive the complete fill of the order quantity.

A synthetic strategy engine may receive values for the plurality of pay-up parameters via the trading interface. In certain embodiments, the synthetic strategy engine may determine an ending time by which the trade order is to be filled according to the values for the plurality of pay-up parameters. The ending time may be calculated from the value of the pay-up interval and the value of the pay-up counter. The pay-up parameters may also, or alternatively, include the ending time.

The trade order may be submitted to the electronic exchange at the order price. The synthetic strategy engine may determine, from market data received from the electronic exchange, that at least a portion of the order quantity is unfilled after the value of the pay-up interval expires. The synthetic strategy engine may change the order price according to the value of the pay-up amount after the value of the pay-up interval expires. For example, the synthetic strategy engine may change the order price after the expiration of a fixed time period defined by the user. In certain embodiments, the synthetic strategy engine may change the order price by comparing the current volatility of the market to a historical volatility of the same market in order to determine if the market is likely to change within a time frame of interest. The value of the pay-up counter may be changed to reflect the change in the order price. The value of the pay-up counter may be changed by increasing the value of the pay-up counter when the order price is changed.

The trade order may comprise a child order of a plurality of child orders submitted to the electronic exchange at time slicer intervals. The order quantity of the child order may be a portion of a total order quantity for a parent order associated with the plurality of child orders.

The synthetic strategy engine may determine, from the market data received from the electronic exchange, that at least another portion of the order quantity is unfilled after the value of the pay-up interval expires. The synthetic strategy engine may determine that the pay-up counter is unexpired. The synthetic strategy engine may determine that a current time is less than the ending time. The synthetic strategy engine may update the trade order at the electronic exchange to increase the order price by the value of the pay-up amount.

The synthetic strategy engine may determine, from the market data received from the electronic exchange, that at least another portion of the order quantity is unfilled after the ending time expires. The synthetic strategy engine may update the order price to receive a complete fill of the order quantity after the ending time expires. Prior to the ending time, the order price may continue to be changed according to the value of the pay-up amount each time the value of the pay-up interval expires. An indication of a user action may be received to begin the pay-up interval after the trade order has already been submitted to the electronic exchange.

A trading interface may be provided for display at a trading device that comprises at least two pay-up parameters. The at least two pay-up parameters may be defined with a parameter value associated with filling a trade order associated with the at least one tradeable object by an ending time. The trade order may comprise an order price and an order quantity.

A synthetic strategy engine may receive the at least two pay-up parameter values via the trading interface. The at least two pay-up parameters may comprise the pay-up amount, the pay-up counter, and/or the pay-up interval. The at least two pay-up parameters may indicate a number of retries for completely filling the trade order (e.g., with the pay-up counter). The synthetic strategy engine may determine the ending time by which the trade order is to be filled according to the at least two pay-up parameter values. The synthetic strategy engine may attempt to fill the trade order according to the at least two pay-up parameter values. The synthetic strategy engine may determine whether the trade order is completely filled from market data received from the electronic exchange. In response to a determination that the trade order is unfilled, attempts may be made to completely fill the trade order at different time intervals according to the at least two pay-up parameter values until the ending time or the trade order is completely filled. The synthetic strategy engine may communicate that the trade order is completely filled to the trading device.

EXAMPLE ELECTRONIC TRADING SYSTEM

FIG. 1 illustrates a block diagram representative of an example electronic trading system 100 in which certain embodiments may be employed. The system 100 includes a trading device 110, a gateway 120, and an exchange 130. The trading device 110 is in communication with the gateway 120. The gateway 120 is in communication with the exchange 130. As used herein, the phrase "in communication with" encompasses direct communication and/or indirect communication through one or more intermediary components. The exemplary electronic trading system 100 depicted in FIG. 1 may be in communication with additional components, subsystems, and elements to provide additional functionality and capabilities without departing from the teaching and disclosure provided herein.

In operation, the trading device 110 may receive market data from the exchange 130 through the gateway 120. A user may utilize the trading device 110 to monitor this market data and/or base a decision to send an order message to buy or sell one or more tradeable objects to the exchange 130.

Market data may include data about a market for a tradeable object. For example, market data may include the inside market, market depth, last traded price ("LTP"), a last traded quantity ("LTQ"), or a combination thereof. The inside market refers to the highest available bid price (best bid) and the lowest available ask price (best ask or best offer) in the market for the tradeable object at a particular point in time (since the inside market may vary over time). Market depth refers to quantities available at price levels including the inside market and away from the inside market. Market depth may have "gaps" due to prices with no quantity based on orders in the market.

The price levels associated with the inside market and market depth can be provided as value levels which can encompass prices as well as derived and/or calculated representations of value. For example, value levels may be displayed as net change from an opening price. As another example, value levels may be provided as a value calculated from prices in two other markets. In another example, value levels may include consolidated price levels.

A tradeable object is anything which may be traded. For example, a certain quantity of the tradeable object may be bought or sold for a particular price. A tradeable object may include, for example, financial products, stocks, options, bonds, future contracts, currency, warrants, funds derivatives, securities, commodities, swaps, interest rate products, index-based products, traded events, goods, or a combination thereof. A tradeable object may include a product listed and/or administered by an exchange, a product defined by the user, a combination of real or synthetic products, or a combination thereof. There may be a synthetic tradeable object that corresponds and/or is similar to a real tradeable object.

An order message is a message that includes a trade order. A trade order may be, for example, a command to place an order to buy or sell a tradeable object; a command to initiate managing orders according to a defined trading strategy; a command to change, modify, or cancel an order; an instruction to an electronic exchange relating to an order; or a combination thereof.

The trading device 110 may include one or more electronic computing platforms. For example, the trading device 110 may include a desktop computer, hand-held device, laptop, server, a portable computing device, a trading terminal, an embedded trading system, a workstation, an algorithmic trading system such as a "black box" or "grey box" system, cluster of computers, or a combination thereof. As another example, the trading device 110 may include a single or multi-core processor in communication with a memory or other storage medium configured to accessibly store one or more computer programs, applications, libraries, computer readable instructions, and the like, for execution by the processor.

As used herein, the phrases "configured to" and "adapted to" encompass that an element, structure, or device has been modified, arranged, changed, or varied to perform a specific function or for a specific purpose.

By way of example, the trading device 110 may be implemented as a personal computer running a copy of X_TRADER®, an electronic trading platform provided by Trading Technologies International, Inc. of Chicago, Illinois ("Trading Technologies"). As another example, the trading device 110 may be a server running a trading application providing automated trading tools such as ADL®, AUTOSPREADER®, and/or AUTOTRADER™, also provided by Trading Technologies. In yet another example, the trading device 110 may include a trading terminal in communication with a server, where collectively the trading terminal and the server are the trading device 110.

The trading device 110 is generally owned, operated, controlled, programmed, configured, or otherwise used by a user. As used herein, the phrase "user" may include, but is not limited to, a human (for example, a trader), trading group (for example, a group of traders), or an electronic trading device (for example, an algorithmic trading system). One or more users may be involved in the ownership, operation, control, programming, configuration, or other use, for example.

The trading device 110 may include one or more trading applications. As used herein, a trading application is an application that facilitates or improves electronic trading. A trading application provides one or more electronic trading tools. For example, a trading application stored by a trading device may be executed to arrange and display market data in one or more trading windows. In another example, a trading application may include an automated spread trading application providing spread trading tools. In yet another example, a trading application may include an algorithmic trading application that automatically processes an algorithm and performs certain actions, such as placing an order, modifying an existing order, deleting an order. In yet another example, a trading application may provide one or more trading screens. A trading screen may provide one or more trading tools that allow interaction with one or more markets. For example, a trading tool may allow a user to obtain and view market data, set order entry parameters, submit order messages to an exchange, deploy trading algorithms, and/or monitor positions while implementing various trading strategies. The electronic trading tools provided by the trading application may always be available or may be available only in certain configurations or operating modes of the trading application.

A trading application may be implemented utilizing computer readable instructions that are stored in a computer readable medium and executable by a processor. A computer readable medium may include various types of volatile and non-volatile storage media, including, for example, random access memory, read-only memory, programmable read-only memory, electrically programmable read-only memory, electrically erasable read-only memory, flash memory, any combination thereof, or any other tangible data storage device. As used herein, the term non-transitory or tangible computer readable medium is expressly defined to include any type of computer readable storage media and to exclude propagating signals.

One or more components or modules of a trading application may be loaded into the computer readable medium of the trading device 110 from another computer readable medium. For example, the trading application (or updates to the trading application) may be stored by a manufacturer, developer, or publisher on one or more CDs or DVDs, which are then loaded onto the trading device 110 or to a server from which the trading device 110 retrieves the trading application. As another example, the trading device 110 may receive the trading application (or updates to the trading application) from a server, for example, via the Internet or an internal network. The trading device 110 may receive the trading application or updates when requested by the trading device 110 (for example, "pull distribution") and/or unrequested by the trading device 110 (for example, "push distribution").

The trading device 110 may be adapted to send order messages. For example, the order messages may be sent through the gateway 120 to the exchange 130. As another example, the trading device 110 may be adapted to send order messages to a simulated exchange in a simulation environment which does not effectuate real-world trades.

The order messages may be sent at the request of a user. For example, a trader may utilize the trading device 110 to send an order message or manually input one or more parameters for a trade order (for example, an order price and/or quantity). As another example, an automated trading tool provided by a trading application may calculate one or more parameters for a trade order and automatically send the order message. In some instances, an automated trading tool may prepare the order message to be sent but not actually send it without confirmation from a user.

An order message may be sent in one or more data packets or through a shared memory system. For example, an order message may be sent from the trading device 110 to the exchange 130 through the gateway 120. The trading device 110 may communicate with the gateway 120 using a local area network, a wide area network, a wireless network, a virtual private network, a cellular network, a peer-to-peer network, a T1 line, a T3 line, an integrated services digital network ("ISDN") line, a point-of-presence, the Internet, a shared memory system and/or a proprietary network such as TTNET™ provided by Trading Technologies, for example.

The gateway 120 may include one or more electronic computing platforms. For example, the gateway 120 may be implemented as one or more desktop computer, hand-held device, laptop, server, a portable computing device, a trading terminal, an embedded trading system, workstation with a single or multi-core processor, an algorithmic trading system such as a "black box" or "grey box" system, cluster of computers, or any combination thereof.

The gateway 120 may facilitate communication. For example, the gateway 120 may perform protocol translation for data communicated between the trading device 110 and the exchange 130. The gateway 120 may process an order message received from the trading device 110 into a data format understood by the exchange 130, for example. Similarly, the gateway 120 may transform market data in an exchange-specific format received from the exchange 130 into a format understood by the trading device 110, for example.

The gateway 120 may include a trading application, similar to the trading applications discussed above, that facilitates or improves electronic trading. For example, the gateway 120 may include a trading application that tracks orders from the trading device 110 and updates the status of the order based on fill confirmations received from the exchange 130. As another example, the gateway 120 may include a trading application that coalesces market data from the exchange 130 and provides it to the trading device 110. In yet another example, the gateway 120 may include a trading application that provides risk processing, calculates implieds, handles order processing, handles market data processing, or a combination thereof.

In certain embodiments, the gateway 120 communicates with the exchange 130 using a local area network, a wide area network, a wireless network, a virtual private network, a cellular network, a peer-to-peer network, a T1 line, a T3 line, an ISDN line, a point-of-presence, the Internet, a shared memory system, and/or a proprietary network such as TTNET™ provided by Trading Technologies, for example.

The exchange 130 may be owned, operated, controlled, or used by an exchange entity. Example exchange entities include the CME Group, the London International Financial Futures and Options Exchange, the Intercontinental Exchange, and Eurex. The exchange 130 may include an electronic matching system, such as a computer, server, or other computing device, which is adapted to allow tradeable objects, for example, offered for trading by the exchange, to be bought and sold. The exchange 130 may include separate entities, some of which list and/or administer tradeable objects and others which receive and match orders, for example. The exchange 130 may include an electronic communication network ("ECN"), for example.

The exchange 130 may be an electronic exchange. The exchange 130 is adapted to receive order messages and match contra-side trade orders to buy and sell tradeable objects. Unmatched trade orders may be listed for trading by the exchange 130. Once an order to buy or sell a tradeable object is received and confirmed by the exchange, the order is considered to be a working order until it is filled or cancelled. If only a portion of the quantity of the order is matched, then the partially filled order remains a working order. The trade orders may include trade orders received from the trading device 110 or other devices in communication with the exchange 130, for example. For example, typically the exchange 130 will be in communication with a variety of other trading devices (which may be similar to trading device 110) which also provide trade orders to be matched.

The exchange 130 is adapted to provide market data. Market data may be provided in one or more messages or data packets or through a shared memory system. For example, the exchange 130 may publish a data feed to subscribing devices, such as the trading device 110 or gateway 120. The data feed may include market data.

The system 100 may include additional, different, or fewer components. For example, the system 100 may include multiple trading devices, gateways, and/or exchanges. In another example, the system 100 may include other communication devices, such as middleware, firewalls, hubs, switches, routers, servers, exchange-specific communication equipment, modems, security managers, and/or encryption/decryption devices.

EXPANDED EXAMPLE ELECTRONIC TRADING SYSTEM

Figure 2:
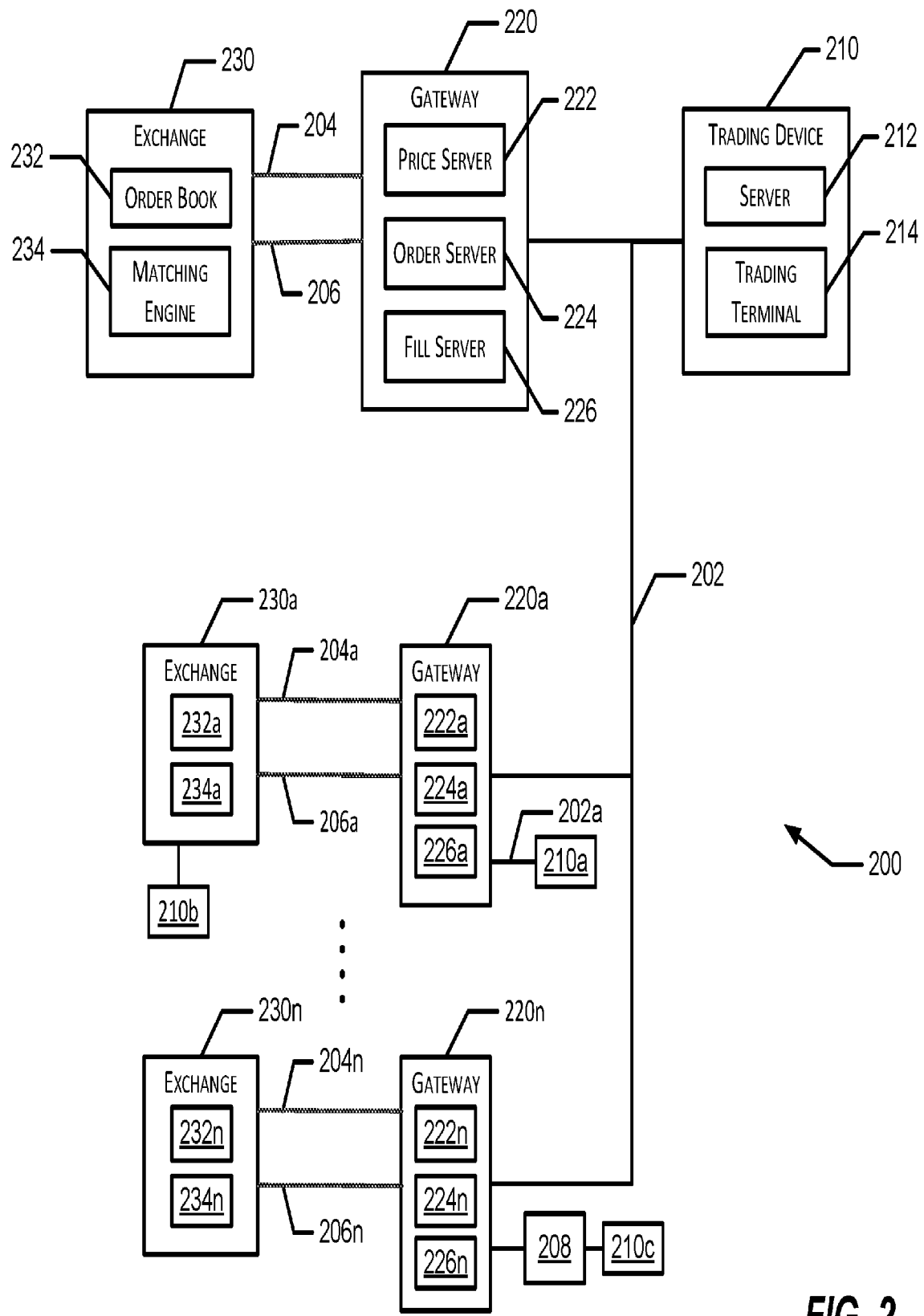
FIG. 2 illustrates a block diagram of another example electronic trading system in which certain embodiments may be employed.

FIG. 2 illustrates a block diagram of another example electronic trading system 200 in which certain embodiments may be employed. In this example, a trading device 210 may utilize one or more communication networks to communicate with a gateway 220 and exchange 230. For example, the trading device 210 utilizes network 202 to communicate with the gateway 220, and the gateway 220, in turn, utilizes the networks 204 and 206 to communicate with the exchange 230. As used herein, a network facilitates or enables communication between computing devices such as the trading device 210, the gateway 220, and the exchange 230.

The following discussion generally focuses on the trading device 210, gateway 220, and the exchange 230. However, the trading device 210 may also be connected to and communicate with "n" additional gateways (individually identified as gateways 220a-220n, which may be similar to gateway 220) and "n" additional exchanges (individually identified as exchanges 230a-230n, which may be similar to exchange 230) by way of the network 202 (or other similar networks). Additional networks (individually identified as networks 204a-204n and 206a-206n, which may be similar to networks 204 and 206, respectively) may be utilized for communications between the additional gateways and exchanges. The communication between the trading device 210 and each of the additional exchanges 230a-230n need not be the same as the communication between the trading device 210 and exchange 230. Generally, each exchange has its own preferred techniques and/or formats for communicating with a trading device, a gateway, the user, or another exchange. It should be understood that there is not necessarily a one-to-one mapping between gateways 220a-220n and exchanges 230a-230n. For example, a particular gateway may be in communication with more than one exchange. As another example, more than one gateway may be in communication with the same exchange. Such an arrangement may, for example, allow one or more trading devices 210 to trade at more than one exchange (and/or provide redundant connections to multiple exchanges).

Additional trading devices 210a-210n, which may be similar to trading device 210, may be connected to one or more of the gateways 220a-220n and exchanges 230a-230n. For example, the trading device 210a may communicate with the exchange 230a via the gateway 220a and the networks 202a, 204a and 206a. In another example, the trading device 210b may be in direct communication with exchange 230a. In another example, trading device 210c may be in communication with the gateway 220n via an intermediate device 208 such as a proxy, remote host, or WAN router.

The trading device 210, which may be similar to the trading device 110 in FIG. 1, includes a server 212 in communication with a trading terminal 214. The server 212 may be located geographically closer to the gateway 220 than the trading terminal 214 in order to reduce latency. In operation, the trading terminal 214 may provide a trading screen to a user and communicate commands to the server 212 for further processing. For example, a trading algorithm may be deployed to the server 212 for execution based on market data. The server 212 may execute the trading algorithm without further input from the user. In another example, the server 212 may include a trading application providing automated trading tools and communicate back to the trading terminal 214. The trading device 210 may include additional, different, or fewer components.

In operation, the network 202 may be a multicast network configured to allow the trading device 210 to communicate with the gateway 220. Data on the network 202 may be logically separated by subject such as, for example, by prices, orders, or fills. As a result, the server 212 and trading terminal 214 can subscribe to and receive data such as, for example, data relating to prices, orders, or fills, depending on their individual needs.

The gateway 220, which may be similar to the gateway 120 of FIG. 1, may include a price server 222, order server 224, and fill server 226. The gateway 220 may include additional, different, or fewer components. The price server 222 may process price data. Price data includes data related to a market for one or more tradeable objects. The order server 224 processes order data. Order data is data related to a user's trade orders. For example, order data may include order messages, confirmation messages, or other types of messages. The fill server collects and provides fill data. Fill data includes data relating to one or more fills of trade orders. For example, the fill server 226 may provide a record of trade orders, which have been routed through the order server 224, that have and have not been filled. The servers 222, 224, and 226 may run on the same machine or separate machines. There may be more than one instance of the price server 222, the order server 224, and/or the fill server 226 for gateway 220. In certain embodiments, the additional gateways 220a-220n may each includes instances of the servers 222, 224, and 226 (individually identified as servers 222a-222n, 224a-224n, and 226a-226n).

The gateway 220 may communicate with the exchange 230 using one or more communication networks. For example, as shown in FIG. 2, there may be two communication networks connecting the gateway 220 and the exchange 230. The network 204 may be used to communicate market data to the price server 222. In some instances, the exchange 230 may include this data in a data feed that is published to subscribing devices. The network 206 may be used to communicate order data to the order server 224 and the fill server 226. The network 206 may also be used to communicate order data from the order server 224 to the exchange 230.

The exchange 230, which may be similar to the exchange 130 of FIG. 1, includes an order book 232 and a matching engine 234. The exchange 230 may include additional, different, or fewer components. The order book 232 is a database that includes data relating to unmatched trade orders that have been submitted to the exchange 230. For example, the order book 232 may include data relating to a market for a tradeable object, such as the inside market, market depth at various price levels, the last traded price, and the last traded quantity. The matching engine 234 may match contra-side bids and offers pending in the order book 232. For example, the matching engine 234 may execute one or more matching algorithms that match contra-side bids and offers. A sell order is contra-side to a buy order. Similarly, a buy order is contra-side to a sell order. A matching algorithm may match contra-side bids and offers at the same price, for example. In certain embodiments, the additional exchanges 230a-230n may each include order books and matching engines (individually identified as the order book 232a-232n and the matching engine 234a-234n, which may be similar to the order book 232 and the matching engine 234, respectively). Different exchanges may use different data structures and algorithms for tracking data related to orders and matching orders.

In operation, the exchange 230 may provide price data from the order book 232 to the price server 222 and order data and/or fill data from the matching engine 234 to the order server 224 and/or the fill server 226. Servers 222, 224, 226 may process and communicate this data to the trading device 210. The trading device 210, for example, using a trading application, may process this data. For example, the data may be displayed to a user. In another example, the data may be utilized in a trading algorithm to determine whether a trade order should be submitted to the exchange 230. The trading device 210 may prepare and send an order message to the exchange 230.

In certain embodiments, the gateway 220 is part of the trading device 210. For example, the components of the gateway 220 may be part of the same computing platform as the trading device 210. As another example, the functionality of the gateway 220 may be performed by components of the trading device 210. In certain embodiments, the gateway 220 is not present. Such an arrangement may occur when the trading device 210 does not need to utilize the gateway 220 to communicate with the exchange 230, such as if the trading device 210 has been adapted to communicate directly with the exchange 230.

EXAMPLE COMPUTING DEVICE

Figure 3:
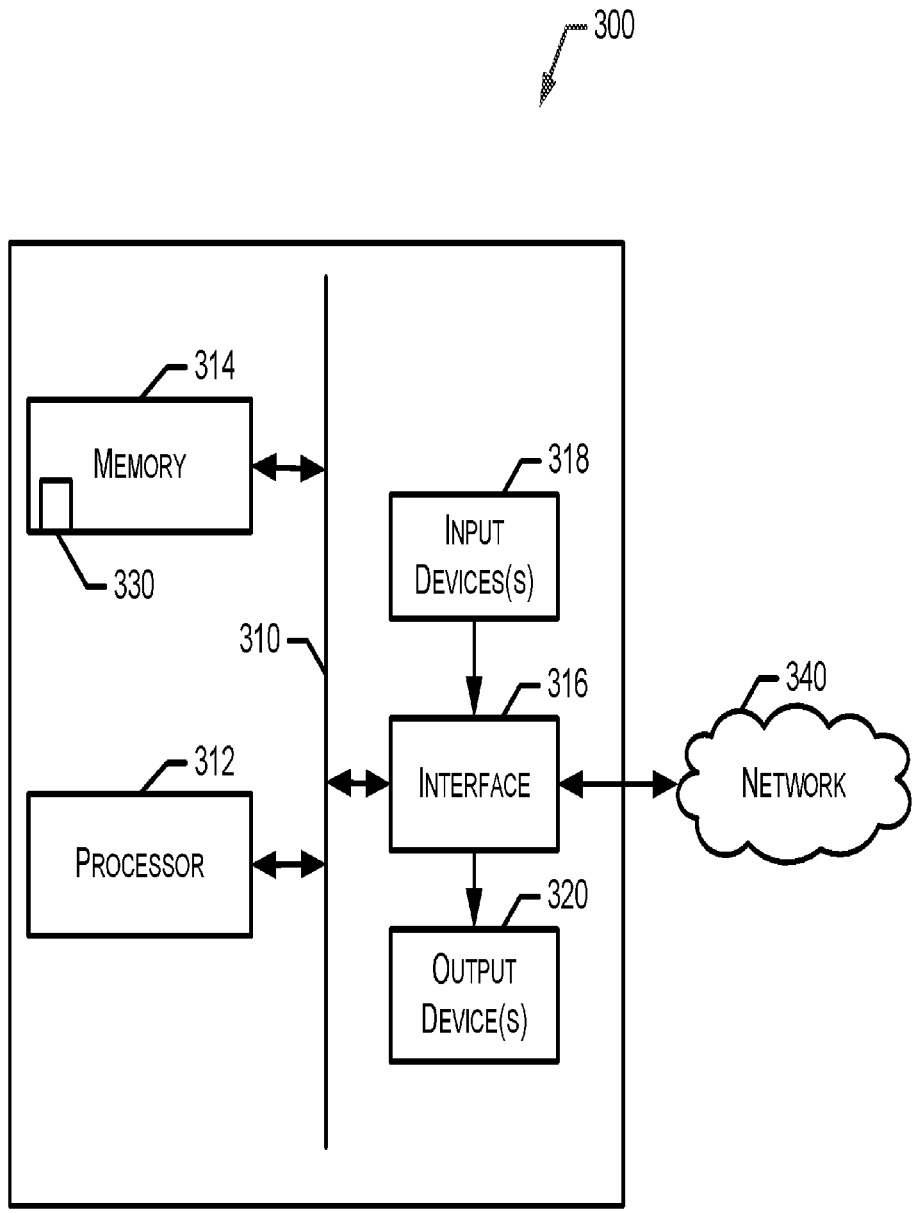
FIG. 3 illustrates a block diagram of an example computing device which may be used to implement the disclosed embodiments.

FIG. 3 illustrates a block diagram of an example computing device 300 which may be used to implement the disclosed embodiments. The trading device 110 of FIG. 1 may include one or more computing devices 300, for example. The gateway 120 of FIG. 1 may include one or more computing devices 300, for example. The exchange 130 of FIG. 1 may include one or more computing devices 300, for example.

The computing device 300 includes a communication network 310, a processor 312, a memory 314, an interface 316, an input device 318, and an output device 320. The computing device 300 may include additional, different, or fewer components. For example, multiple communication networks, multiple processors, multiple memory, multiple interfaces, multiple input devices, multiple output devices, or any combination thereof, may be provided. As another example, the computing device 300 may not include an input device 318 or output device 320.

As shown in FIG. 3, the computing device 300 may include a processor 312 coupled to a communication network 310. The communication network 310 may include a communication bus, channel, electrical or optical network, circuit, switch, fabric, or other mechanism for communicating data between components in the computing device 300. The communication network 310 may be communicatively coupled with and transfer data between any of the components of the computing device 300.

The processor 312 may be any suitable processor, processing unit, or microprocessor. The processor 312 may include one or more general processors, digital signal processors, application specific integrated circuits, field programmable gate arrays, analog circuits, digital circuits, programmed processors, and/or combinations thereof, for example. The processor 312 may be a single device or a combination of devices, such as one or more devices associated with a network or distributed processing. Any processing strategy may be used, such as multi-processing, multi-tasking, parallel processing, and/or remote processing. Processing may be local or remote and may be moved from one processor to another processor. In certain embodiments, the computing device 300 is a multi-processor system and, thus, may include one or more additional processors which are communicatively coupled to the communication network 310.

The processor 312 may be operable to execute logic and other computer readable instructions encoded in one or more tangible media, such as the memory 314. As used herein, logic encoded in one or more tangible media includes instructions which may be executable by the processor 312 or a different processor. The logic may be stored as part of software, hardware, integrated circuits, firmware, and/or micro-code, for example. The logic may be received from an external communication device via a communication network such as the network 340. The processor 312 may execute the logic to perform the functions, acts, or tasks illustrated in the figures or described herein.

The memory 314 may be one or more tangible media, such as computer readable storage media, for example. Computer readable storage media may include various types of volatile and non-volatile storage media, including, for example, random access memory, read-only memory, programmable read-only memory, electrically programmable read-only memory, electrically erasable read-only memory, flash memory, any combination thereof, or any other tangible data storage device. As used herein, the term non-transitory or tangible computer readable medium is expressly defined to include any type of computer readable medium and to exclude propagating signals. The memory 314 may include any desired type of mass storage device including hard disk drives, optical media, magnetic tape or disk, etc.

The memory 314 may include one or more memory devices. For example, the memory 314 may include local memory, a mass storage device, volatile memory, non-volatile memory, or a combination thereof. The memory 314 may be adjacent to, part of, programmed with, networked with, and/or remote from processor 312, so the data stored in the memory 314 may be retrieved and processed by the processor 312, for example. The memory 314 may store instructions which are executable by the processor 312. The instructions may be executed to perform one or more of the acts or functions described herein or shown in the figures.

The memory 314 may store a trading application 330. In certain embodiments, the trading application 330 may be accessed from or stored in different locations. The processor 312 may access the trading application 330 stored in the memory 314 and execute computer-readable instructions included in the trading application 330.

In certain embodiments, during an installation process, the trading application may be transferred from the input device 318 and/or the network 340 to the memory 314. When the computing device 300 is running or preparing to run the trading application 330, the processor 312 may retrieve the instructions from the memory 314 via the communication network 310.

EXAMPLES FOR UPDATING TRADE ORDERS ACCORDING TO PAY-UP PARAMETERS

A trade order may be submitted to an electronic exchange and updated, according to pay-up parameter values, in an attempt to receive a complete fill of the quantity of the trade order. The price of the trade order may continue to be updated (e.g., increased or decreased toward the market) after each expiration of a time interval according to the pay-up parameter values in an attempt to receive a complete fill of the trade order at a different price value. While the trade order is resting at the electronic exchange at each interval, the market may drift closer to the price at which the trade order is resting. After the interval lapses, the working order may drift closer to the market to have an opportunity for a fill.

Figure 4:
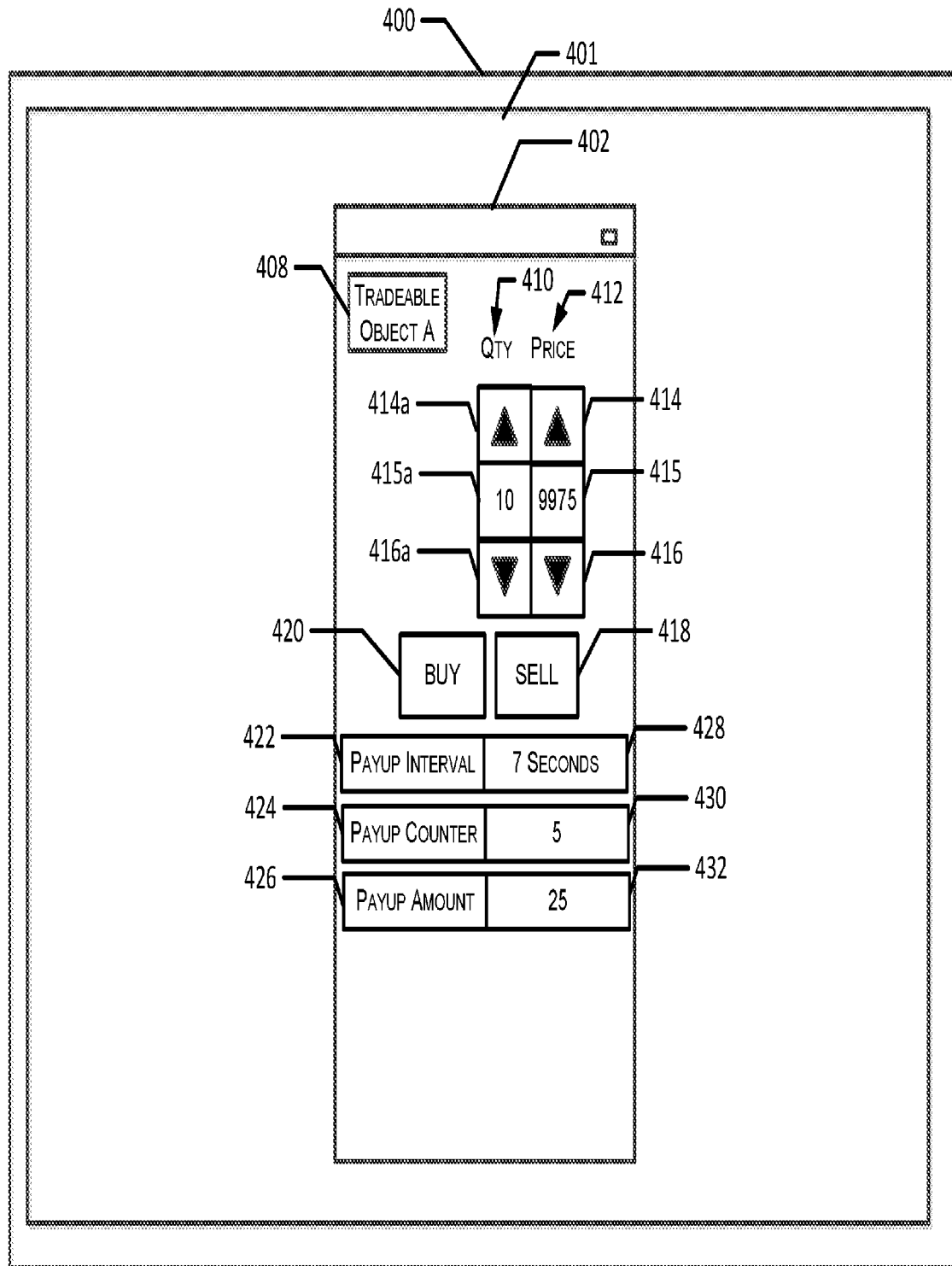
FIG. 4 illustrates an example trading interface for receiving trading parameters and/or order parameters as described herein.

FIG. 4 illustrates example trading interface 402 for certain embodiments described herein. As shown in FIG. 4A, the trading interface 402 may be displayed on a computing device 400. The computing device may be a trading device, or portion thereof, for example. The computing device 400 may comprise a display 401 for displaying the trading interface 402. The display 401 may receive input from a user via touch or via an input device such as a mouse or a keyboard.

The display 401 may cooperate with an application for displaying trading interfaces for trading tools. The application may be generated locally at the computing device 400, or by a remote device and displayed on the computing device 400 generated locally on the computing device 400. For example, the application may be a web browser or other application capable of displaying information generated at a remote location.

The trading interface 402 may be used to select the criteria for a trade order to be submitted for a tradeable object 408 at an electronic exchange. The trading interface 402 may include a quantity selection component 410 for selecting the quantity of the tradeable object 408 to be submitted at the electronic exchange. The trading interface 402 may include a price selection component 412 for selecting the price at which the trade order will be submitted to the electronic exchange.

The trading interface 402 may include graphical elements, such as buttons or text boxes. The price increase button 414 may increase the indicated price in the price text box 415. The price decrease button 416 may decrease the indicated price in the price text box 415. Similarly, the quantity increase button 414a and the quantity decrease button 416a may increase or decrease, respectively, the indicated quantity in the quantity text box 415a. The user may also change the price value or the quantity value by inserting the desired values directly into the respective price text box 415 and the quantity text box 415a. The trading interface 402 may include a buy button 420 for submitting a bid and/or a sell button 418 for submitting an offer, respectively, to the electronic exchange. The bid or offer may be submitted at the indicated quantity in the quantity selection component 410 and at the indicated price in the price selection component 412.

The trading interface 402 may include pay-up parameters for the trade order. The pay-up parameters may be defined for changing an order to increase the chances of filling the order after a period of time has elapsed without a fill. The pay-up parameters may include a pay-up interval 422, a pay-up counter 424, a pay-up amount 426, or any combination thereof. The pay-up interval 422 may be defined to indicate a time interval to wait prior to an increase or decrease in the order price when at least a portion of the order quantity is unfilled at the electronic exchange. The pay-up counter 424 may be defined to indicate a number of times to change the order price in an attempt to receive a complete fill of the order quantity over a period of time. The pay-up amount 426 may be defined to indicate an amount to increase or decrease the order price after each interval that lapses without receiving a complete fill of the order quantity. The pay-up amount 426 may be defined as one or more ticks for a given market.

Each pay-up parameter may be defined with pay-up values. As shown in FIG. 4, the pay-up interval 422 may be defined with a pay-up interval value 428. The pay-up interval value 428 may be defined in portions of time, such as milliseconds, seconds, minutes, etc. For example, the pay-up interval value 428 may be defined according to a schedule. The schedule could specify that the pay-up value may be changed a first time after three (3) seconds, a second time after five (5) more seconds in the market, and a third time after two (2) seconds in the market. In certain embodiments, the number of portions of time, and the amount of time associated with each portion may be specified in the schedule. For example, the schedule could specify a pay-up interval value 428 of six (6) seconds with a variance between intervals of fifty percent (50%). In certain embodiments, a schedule specified as described might include a first six (6) second interval, a second three (3) second interval, a third four and a half second (4.5) interval, and a fourth two and a quarter (2.25) second interval. The pay-up interval value 428 may be a numerical value set to a default, such as a default value of one second, in the event another definition of the pay-up interval value 428 is not received. The pay-up interval value 428 may be counted on an internal counter at the computing device 400, or a remote computing device. The pay-up interval value 428 may begin being counted at the time of the submission of the order, or upon receiving another indication from the user (e.g., a button press or other user action at the computing device 401). After the expiration of the pay-up interval value 428, the computing device 400, or a remote computing device, may change the price of the working trade order in an attempt to receive a fill of the order quantity pending at the electronic exchange. For example, the price of the working trade order may be increased or decreased toward the market in an attempt to fill the order quantity of the working trade order.

The pay-up counter 424 may be defined with a pay-up counter value 430. The pay-up counter 424 may be set to the pay-up counter value 430 and decreased each time the pay-up interval value 428 elapses, or may be set to zero and may increase each time the pay-up interval value 428 elapses. After the pay-up counter value 430 expires, the computing device 400, or a remote computing device, may change the price of the working trade order to a price at which a contra-side quantity value is sufficient for a complete fill of the order quantity pending at the electronic exchange. The pay-up counter value 430 may be set to a default value if no other value is defined. The pay-up counter value 430 may be set to zero and/or may go unused if the ending time for implementing the pay-up parameters is otherwise defined.

The pay-up amount 426 may be defined with a pay-up amount value 432. The pay-up amount value 432 may define the value that the working trade order may be changed in an attempt to receive a fill of the order quantity pending at the electronic exchange. For example, the price of the working trade order may be increased or decreased toward the market by the pay-up amount value 432 in an attempt to fill the order quantity of the working trade order. The pay-up counter value 430 may be set to a default value if no other value is defined. The pay-up counter value 430 may be set to a default value of one tick, for example.

The pay-up parameter values may be implemented (e.g., at the computing device or a remote computing device) until a complete fill of the quantity value of the working order is received, or until an ending time. The ending time, prior to which the pay-up parameters may be implemented, may be a separate pay-up parameter in the trading interface 402, may be predefined, and/or may be defined from the other pay-up parameter values. The ending time may be calculated or predefined at the computing device, or a remote computing device. For example, the ending time may be set to infinity or another predefined number. The user may change the ending time by setting a period of time for which the pay-up parameters may be implemented. For example, the user may define the ending time by setting the pay-up interval value 428 and the pay-up counter value 430, which may define the ending time at the amount of time of the pay-up interval value 428 multiplied by the pay-up counter value 430. If the pay-up counter value 430 is undefined, the working trade order may continue to be changed according to the other pay-up parameters until a complete fill is received.

The pay-up parameter values may be implemented by a synthetic strategy engine to change a working order in an effort to obtain a complete fill of a working order at an electronic exchange, while mitigating any loss in value that may be caused by increasing or reducing the price of the working order to obtain the complete fill. The synthetic strategy engine may be implemented on one or more trading devices. The synthetic strategy engine may submit trade orders for synthetic tradeable objects that correspond and/or are similar to a real tradeable object. They synthetic strategy engine may also, or alternatively, submit trade orders for real tradeable objects.

In one example, the order parameters and/or the pay-up parameter values may be defined for a time sliced order. The pay-up parameters may be implemented on each child order of a parent order for which the pay-up parameter values and/or the order parameter values may be defined. Examples for using the defined order parameters for a time sliced order are described elsewhere herein.

The defined pay-up parameters may allow a user to exit the market over a period of time, while making attempts at receiving a complete fill at different values to help mitigate any losses that may be caused by exiting the market. This gives the user an opportunity to allow the market to increase or decrease toward the resting value of a working order over intervals of time.

Figure 5A:
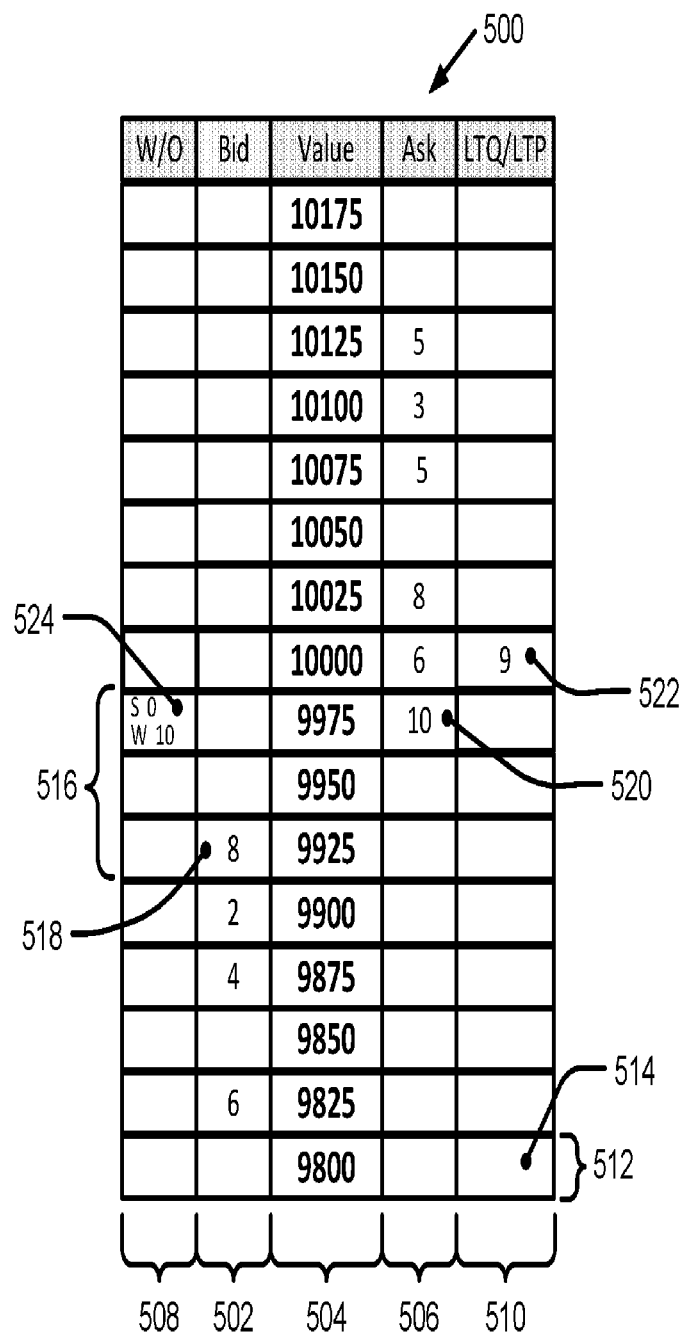
FIGS. 5A, 5C, 5E, and 5G illustrate an example trading interface for display of market data including bid quantity, bid price, ask quantity, and ask price at different times.

FIG. 5A illustrates an example trading interface 500 in which certain embodiments may be employed. The trading interface 500 may be generated for display at a computing device, such as a trading device, for example. In an example, the trading interface 500 may be generated at a synthetic strategy engine for being displayed at a trading device. The example trading interface 500 shows market data for a tradeable object at a first point in time.

As described above in conjunction with FIG. 2, the trading device 210 receives market data related to one or more tradeable objects from the exchange 230 and/or the exchanges 230a-230n through the gateway 220 and/or the gateways 220a-220n, respectively. The trading device 210 provides a trading application including trading tools to process and/or organize the market data and provide the example trading interface 500. Trading tools include, for example, MD TRADER®, TT®, X_TRADER®, ADL®, AUTOSPREADER®, and AUTOTRADER™, each provided by Trading Technologies. The trading device 210 provides the trading interface 500 to enable a user to view market data and communicate trade orders and trade actions with an electronic exchange. The trading interface 500, or other trading interfaces corresponding to other electronic exchanges, may be updated to indicate the allocation or reallocation of a quantity of trade orders across different exchanges. While examples herein are described in conjunction with the example electronic trading system 200 of FIG. 2, the examples disclosed herein may be implemented in other electronic trading systems, such as the example trading system 100 of FIG. 1.

Though the trading interface 500 is shown as a different trading interface than the trading interface 402, shown in FIG. 4, the elements of the trading interfaces 402, 500 may be included in the same trading interface and/or application. In another example, the trading interface 500 may be displayed separate from the trading interface 402 on the same computing device. Regardless of whether the elements of the trading interfaces 402, 500 are displayed in the same interface or different interfaces, the elements of each trading interface 402, 500 may interact with one another, such that when trade orders are placed or modified according to the trade order parameters or the pay-up parameters illustrated in the trading interface 402, the changes in the market data received at the computing device are reflected in the trading interface 500.

In the illustrated example of FIG. 5A, the trading interface 500 includes a bid column 502, a value column 504, and an ask column 506. The trading interface 500 further includes a working order (W/O) column 508 and a last traded quantity (LTQ)/last traded price (LTP) column 510. The trading interface 500 may include other columns such as an estimated position in queue (EPIQ) column, a single combined bid/ask column, a user-defined indicator column, an inside market indicator column, and/or any other column for providing indicators. The trading interface 500 also includes rows such as row 512. The columns intersect with the rows to define cells such as cell 514. In other embodiments, different orientations other than vertical columns may be used (e.g., horizontal and diagonal arrangements).

In the illustrated example, bid indicators representing the bid quantities of the tradeable object are displayed in the bid column 502, value indicators corresponding to value levels are displayed in the value column 504, and ask indicators representing the ask quantities of the tradeable object are displayed in the ask column 506. A bid quantity is a quantity available on the bid side of the tradeable object at a given value level. The value levels can be configured to represent prices, net change, derivatives of price, consolidated prices, synthetic tradeable object pricing, spread pricing, and/or other representations of value. The ask quantity is a quantity available on the ask side of the tradeable object at a given value level. The indicators are not limited to numerical values and can include any type or combination of indicator or symbol to illustrate the presence of available quantity without providing a specific numeric value. For example, the indicators may include text, icons, colors, lines, and/or other graphical representations. In one example, the indicators may represent a range of quantity available at particular value levels in place of specific, and frequently changing, quantity values. In another example, the relative size of indicators may proportionally represent the quantity available. In another example, the indicators may represent simply that there is quantity available with no illustration of the amount in excess of zero.

Trading interfaces, such as the trading interface 500, may include indicators to identify the inside market. The inside market indicators may utilize multiple representations to identify the highest bid price and the lowest ask price. The inside markets indicators may also include additional information such as information related to quantities at the inside market. Examples of inside market indicators include a best bid price indicator representing the highest available bid price, a best ask price indicator representing the lowest available ask price, and/or an indicator representing a range between the highest available bid price and the lowest available ask price. As shown in FIG. 5A, the inside market indicator may highlight and identify the range 516 of value levels between the highest available bid price of "9925" and the lowest available ask price of "9975". Inside market indicators may be displayed within the trading interface to identify specific value level(s) in the value column 504. For example, a best bid price indicator may be displayed in a cell containing a bid quantity indicator and corresponding to a value level that reflects the best bid price. As another example, a best ask price indicator may be a color or symbol combined with an ask quantity indicator in the ask column 506 in a cell corresponding to a value level that reflects the best ask price. As another example, inside market indicators may be displayed at value levels within the value column 504 that reflect the best bid price and the best ask price. The inside market indicators can include any type or combination of indicator or symbol (e.g., the indicators may include text, icons, colors, lines, and/or other graphical representations).

In certain embodiments, the inside market indicators may be provided by the presence of a quantity indicator. The presence of a quantity indicator refers to the existence and location of the quantity indicator. For example, the presence of the best bid quantity indicator, independent of the quantity value displayed at any given point in time, in the bid column may be the best bid price indicator. Thus, the existence of a quantity indicator at the highest value level in the bid column 502 is the best bid price indicator 518. To be clear, in this example, the value of the bid quantity indicator is not part of the best bid price indicator 518. Rather, the existence of the bid quantity indicator itself at the highest value level in the bid column 502 is the best bid price indicator 518. In other words, the display of the highest bid quantity indicator is the best bid price indicator 518. As shown in FIG. 5A, the presence of the bid quantity indicator "8" at the highest value level in the bid column at the price of "9925" is the best bid price indicator 518. Similarly, the presence of the ask quantity indicator "10" at the lowest value level in the ask column at the price of "9975" is the best ask price indicator 520.

From the user's perspective, the trading interface 500 may present and display indicators, such as inside market and LTP/LTQ indicators, in a manner that conveys the appearance of movement relative to the value column 504. For example, the manner in which the trading interface alters the position of the best bid price indicator and the best ask price indicator relative to the value levels within the value column 504 may allow the user to perceive changes in both the speed and direction of trading within a market. The trading interface 500 updates based on received market data. For example, the trading interface 500 moves the best bid price indicator 518 relative to the value column 504 when the received market data includes a quantity at another highest bid price. As another example, the trading interface 500 moves a LTP indicator 522 (shown in the LTQ column 510 of FIG. 5A) relative to the value column 504 when the received market data includes another last traded price.

The trading interface 500 shown in FIG. 5A depicts and identifies the inside market via the best bid price indicator 518 aligned with the highest available bid price and the best ask price indicator 520 aligned with the lowest available ask price at a first point in time. For example, the best bid price indicator 518 may be moved to reflect the change in the best bid price from "9900" to "9925" (shown in FIG. 5A). Similarly, the best ask price indicator 520 may be moved to reflect the change in the best ask price from "10025" to "9975" (shown FIG. 5A). By observing the movement of the inside market indicators relative to the value column 504 in the described manner, the user can quickly perceive that the market is tightening as difference between the best bid and best ask decreases.

The working order column 508 may indicate the current position of a user's working orders at the electronic exchange. Working order indicators, such as working order indicator 524, representing the quantities of the tradeable object working for a user at the electronic exchange are displayed in the working order column 508. The working order indicator 524 may indicate the quantity that is currently working at an exchange and/or the quantity that has been filled (e.g., bought or sold) in a cell. For example, as shown in FIG. 5A, a user has placed an "ask" order for an asking quantity of ten (10) at the price of "9975". The order may be displayed in the user interface 500 as a "working order" with an order quantity of ten (10) being displayed in the working order indicator 524 (e.g., shown as "W: 10" in the corresponding cell). Though the order quantity value of "10" submitted in the trade order is indicated as being the total asking quantity indicated in the ask column 506 as pending at the electronic exchange, the quantity of the working order may be a portion of the total asking quantity in the ask column 506 pending at the electronic exchange for a given price. The symbol "S: 0" in the working order indicator 524 may indicate that an asking quantity of zero (0) has been filled (e.g., sold) from the working order at the electronic exchange. As the quantity of the working order, or portions thereof, are filled, working order indicator 524 may be updated to reflect the quantity filled and the quantity still working. A similar symbol of "B: 0" may indicate that zero (0) working bids have been filled at the electronic exchange. The market data in the trading interface 500 may be updated as market updates are received from the electronic exchange.

The quantity indicators displayed as part of the trading interface 500 each represent an order queue associated with the corresponding price displayed at each value level and arranged to form the value column 504. For example, the bid quantity indicator "8" adjacent to the price of "9925" displayed in the value column 504 represents an order queue waiting to buy eight (8) individual bids at the corresponding price. Similarly, the ask quantity indicator "10" adjacent to the price of "9975" displayed in the value column 504 represents an order queue waiting to sell ten (10) individual tradeable objects at the corresponding price.

Figure 5B:
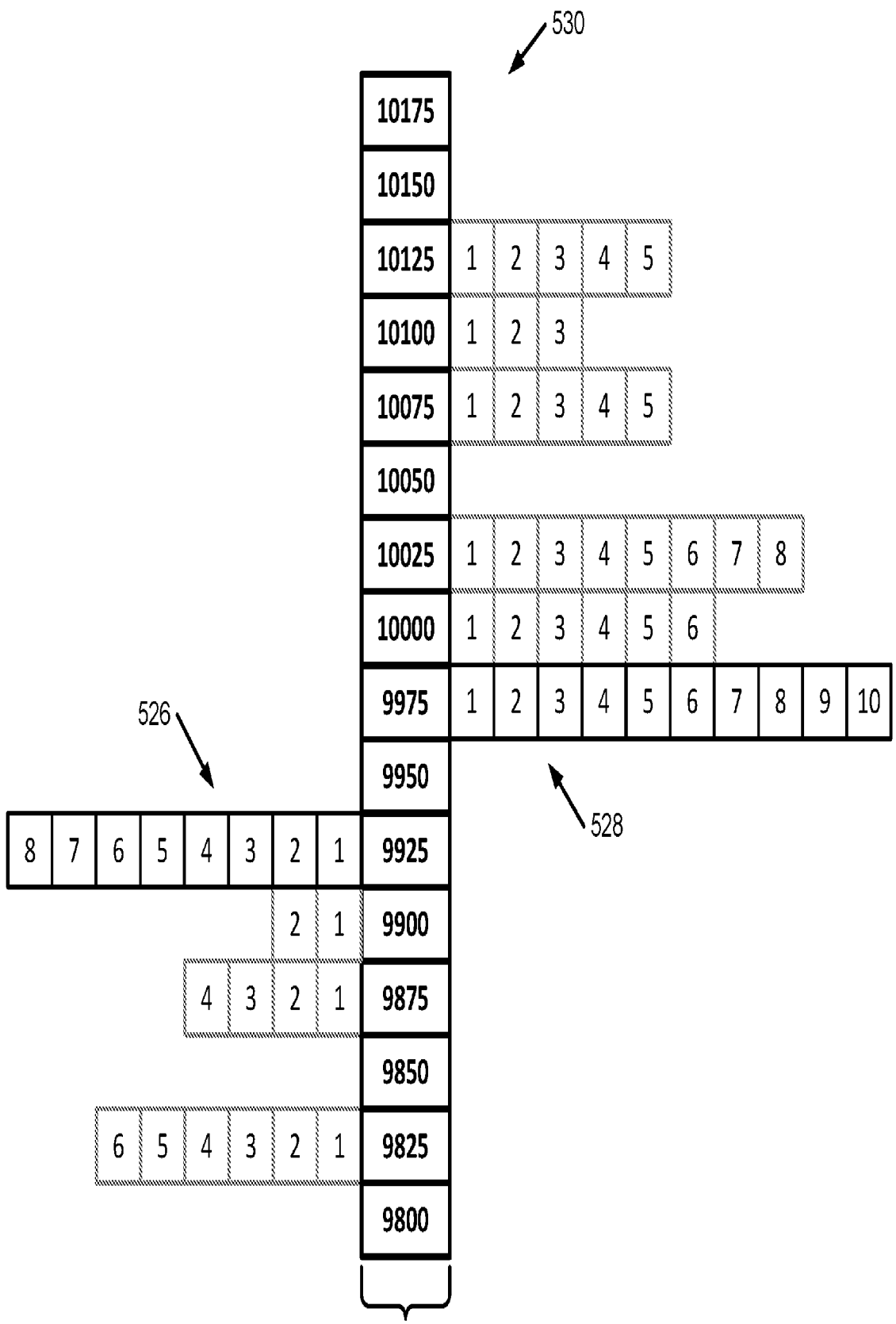
FIGS. 5B, 5D, 5F, and 5H illustrate an example display of market data indicating an allocation of order quantities and queue values at different times at an electronic exchange.

FIG. 5B illustrates an alternate interface 530 representing the trading interface 500 in which the order queue associated with each value level in the value column 504 is expanded to provide detailed quantity and queue position information at the first point in time. For example, an order queue 526 corresponding to the price of "9925" includes eight (8) bids to buy tradeable objects at the indicated price. Similarly, an order queue 528 corresponding to the price of "9975" includes an asking quantity of ten (10) tradeable objects to be sold at the indicated price. As illustrated in FIG. 5B, each tradeable object in the order queue 526 is numbered 1 to 8 to indicate a position within the queue. Similarly, each tradeable object in the order queue 528 is numbered 1 to 10 to indicate a position within the queue. In the illustrated example, lower numbered tradeable objects are closer (e.g., will be filled sooner) to being filled than higher numbered tradeable objects.

The trading interfaces 500, 530 may be updated to reflect changes in working orders implemented by a synthetic strategy engine according to the defined pay-up parameter values. For example, as the quantity in the order queue 528 is a quantity of a working order, the synthetic strategy engine may allow the quantity of the working order in the order queue 528 to rest at the price of "9975" for the pay-up interval value. The synthetic strategy engine may change the working order at the expiration of the pay-up interval by the defined pay-up amount. The synthetic strategy engine may continue to change the working order according to the defined pay-up parameters until the working order receives a complete fill, or an ending time expires.

Figure 5C:
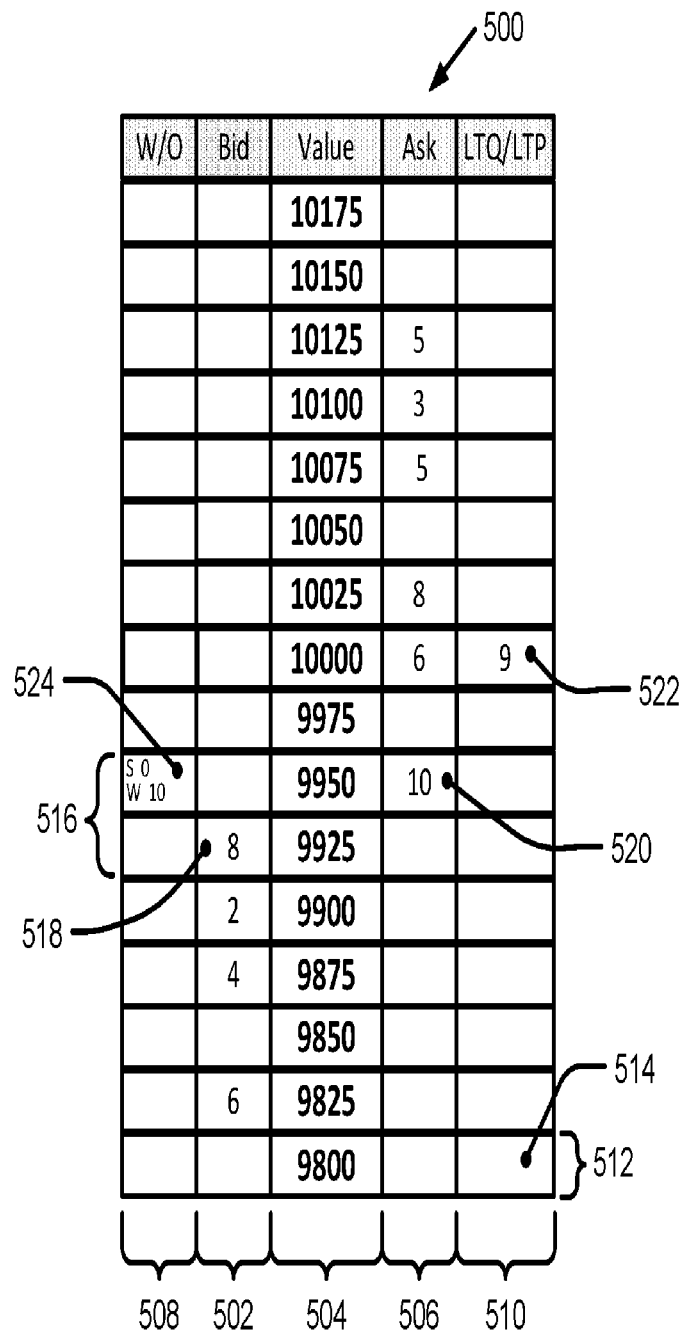

FIG. 5C illustrates the trading interface 500 at a second, later point in time (relative to the first point of time displayed in connections with FIGS. 5A and 5B), at which the working order has been decreased in value according to the defined pay-up amount. The trading interface 500 reflects a decrease in the price of the working order from "9975" to "9950". The quantity of the working order has been moved to correspond to a lower price in the ask column 506 in an effort to cross the market and fill the quantity of the working order. The ask quantity indicator "10" at the lowest value level in the ask column 506 at the price of "9975" has been moved to the lowest value level in the ask column 506 at the price of "9950". Accordingly, the best ask price indicator 520 has been updated in the trading interface 500 to reflect the change in the best ask price. The working order indicator 524 has also been moved down within the working order column 508 to correspond to the price of "9950" to reflect the current status of the working order at the electronic exchange. As the change in the price of the working order has affected the inside market for the tradeable object at the electronic exchange, the inside market indicator may highlight and identify the range 516 of value levels between the highest available bid price of "9925" and the lowest available ask price of "9950".

Figure 5D:
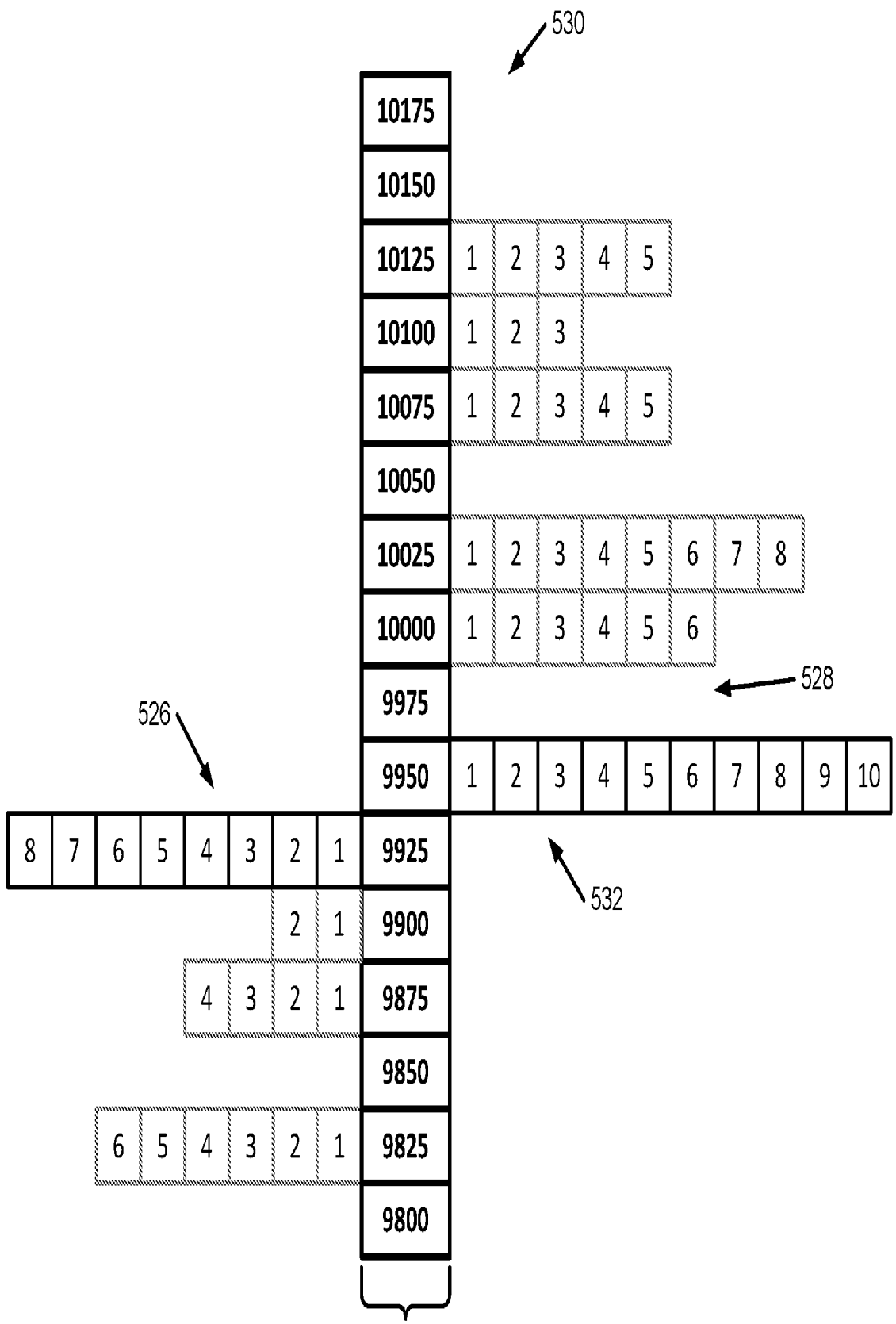

FIG. 5D illustrates the interface 530 at the second point in time occurring after the change in the price of the working order shown in FIG. 5C, in which the order queue associated with each value level in the value column 504 is expanded to provide detailed quantity and queue position information later in time. After receiving one or more market updates, the market data may reflect the change in price of the working order from the price of "9975" to "9950" after the expiration of the pay-up interval. An order queue 532 corresponding to the price of "9950" includes the asking quantity of ten (10) tradeable objects in the updated working order. The order queue 528 has been updated to show an asking quantity of zero (0) tradeable objects, which reflects the movement of the ten (10) tradeable objects of the working order from the price of "9975". The price of the working order may be adjusted via a message to the electronic exchange from the trading device, or the trading device may submit a contra-side order of the same quantity at the previous price of "9975" to get a complete fill and then submit a subsequent trade order of the quantity of ten (10) at the price of "9950" to move the quantity of the working order. The change in price reflects the value of the defined pay-up amount.

Figure 5E:
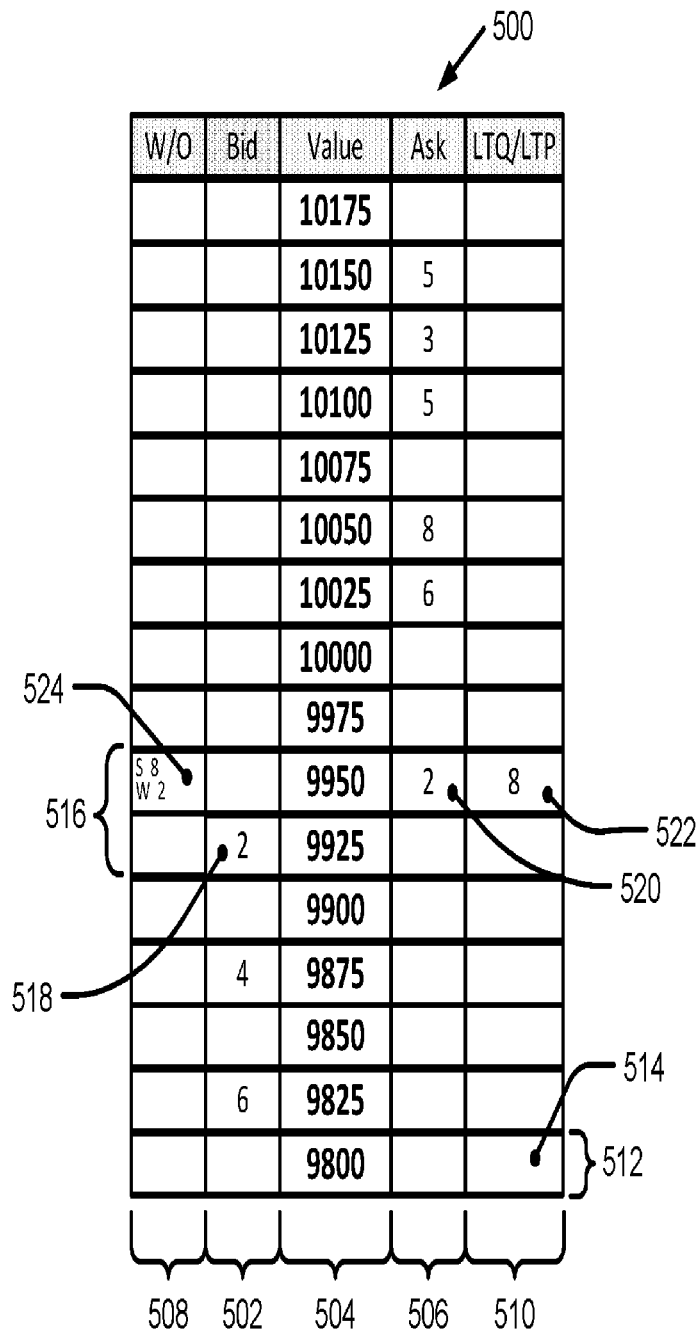

FIG. 5E illustrates the trading interface 500 at a third, later period in time (relative to the time periods displayed in connections with FIGS. 5A-5D), at which the working order has received a partial fill while the working order was resting for the pay-up interval. The trading interface 500 reflects that eight (8) bids for the tradeable object that were previously resting at the price of "9925" increased to "9950" to fill eight (8) of the available ten (10) tradeable objects in the working order resting at "9950". The working order received this partial fill during the defined pay-up interval during which the working order will rest at a price. The quantity of the working order has been decreased in the ask column 506 from ten (10) to two (2) to indicate the portion of the working order that has been filled. The ask quantity indicator "2" is displayed at the lowest value level in the ask column 506 at the price of "9950". Accordingly, the best ask price indicator 520 has been updated in the trading interface 500 to reflect the change in the available quantity at the best ask price. The working order indicator 524 has also been updated in the working order column 508 to reflect the current status of the working order at the electronic exchange. For example, the quantity of tradeable objects sold is indicated as eight (8) and the quantity of tradeable objects still working is indicated as two (2). The trading interface 500 may move the LTP indicator 522 (shown in the LTQ column 510 of FIG. 5E) relative to the value column 504 to indicate that the price of "9950" was the last traded price.

The change in the price of the eight (8) bids for the tradeable object from "9925" to "9950 may have changed the inside market, but, as shown in FIG. 5E, two (2) bids for the tradeable object that were previously resting at the price of "9900" also increased to the price of "9925". As a result, the range 516 of value levels between the highest available bid price of "9925" and the lowest available ask price of "9950" may be maintained.

Figure 5F:
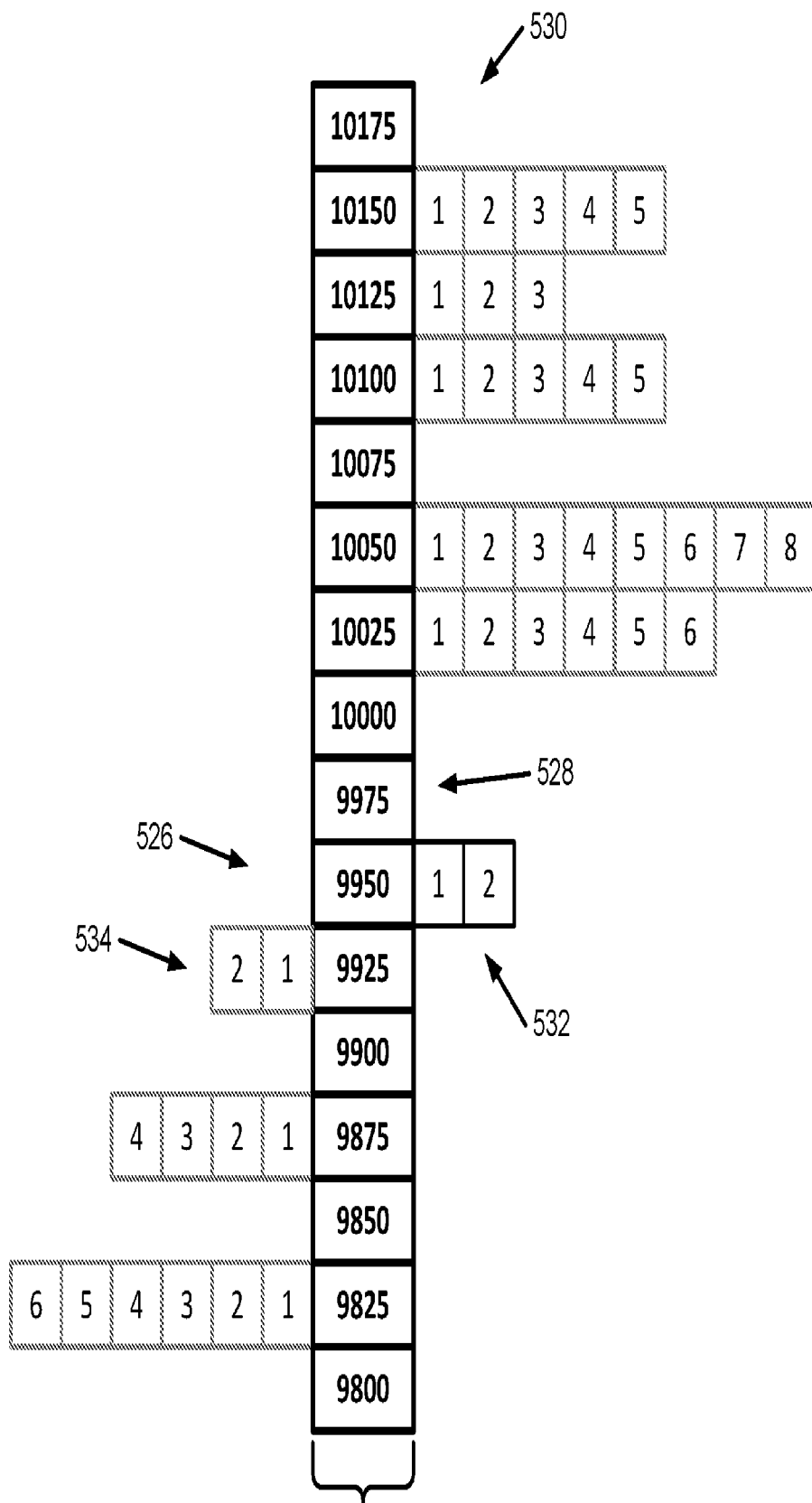

FIG. 5F illustrates the interface 530 at the third point in time occurring after the partial fill of the working order shown in FIG. 5D, in which the order queue associated with each value level in the value column 504 is expanded to provide detailed quantity and queue position information later in time. After receiving one or more market updates, the market data may reflect the change in the quantity of the working order from the quantity of ten (10) to the quantity of two (2) after receiving a partial fill while resting at the price of "9950" during the pay-up interval. The order queue 532 corresponding to the asking quantity available at the price of "9950" has been reduced to an asking quantity of two (2) to reflect the remaining quantity of the working order resting in the order queue 532. The order queue 526 corresponding to the buying quantity available at the price of "9950" has been updated to show zero (0) bids, which reflects the fill of the eight (8) bids of the working order resting at the price of "9950". An order queue 534 corresponding to the available bids at the price of "9925" has been updated to reflect a quantity of two (2) bids, which are currently resting at the electronic exchange.

Figure 5G:
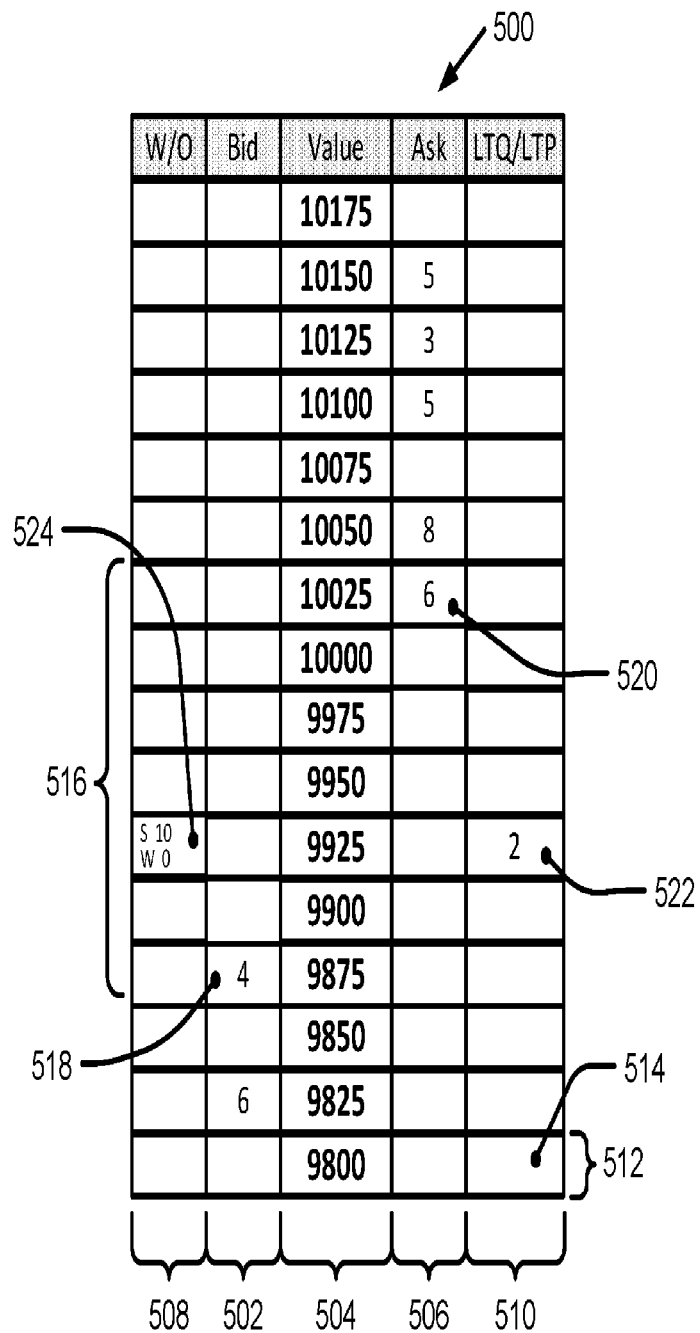

FIG. 5G illustrates the trading interface 500 at a fourth period in time (relative to the time periods displayed in connections with FIGS. 5A-5F), at which the working order has received a complete fill. The trading interface 500 reflects that asking quantity of two (2) tradeable objects for the working order that were previously resting at the price of "9950" have been filled. The trading interface 500 also reflects that the two (2) bids for the tradeable object that were previously resting at the price of "9925" have been filled. The LTP indicator 522 (shown in the LTQ column 510 of FIG. 5G) has been moved relative to the value column 504 to indicate that the price of "9925" was the last traded price. The working order indicator 524 has also been moved down within the working order column 508 to correspond to the price of "9925" to reflect that the quantity of the working order has been completely filled at the electronic exchange.

The updates to the trading interface 500 reflect that the price of the working order was decreased from "9950" to "9925". The synthetic strategy engine has waited for the defined pay-up interval and changed the price of the asking quantity of the working order from "9950" to "9925". The quantity of the working order has been moved, according to the defined pay-up amount, to correspond to a lower price in the ask column 506 in an effort to cross the market and completely fill the quantity of the working order. As there existed an available quantity of two (2) bids at the same price of "9925", the working order received a complete fill.

As the change in the price of the working order has affected the inside market for the tradeable object at the electronic exchange, the inside market indicator may highlight and identify the range 516 of value levels between the highest available bid price of "9875" and the lowest available ask price of "10025". The ask quantity indicator at the lowest value level in the ask column 506 has been moved to correspond to the price of "10025". Accordingly, the best ask price indicator 520 has been updated in the trading interface 500 to reflect the change in the best ask price. The bid quantity indicator at the highest value level in the bid column 502 has also been moved to correspond to the price of "9875". Accordingly, the best ask price indicator 518 has been updated in the trading interface 500 to reflect the change in the best ask price.

Figure 5H:
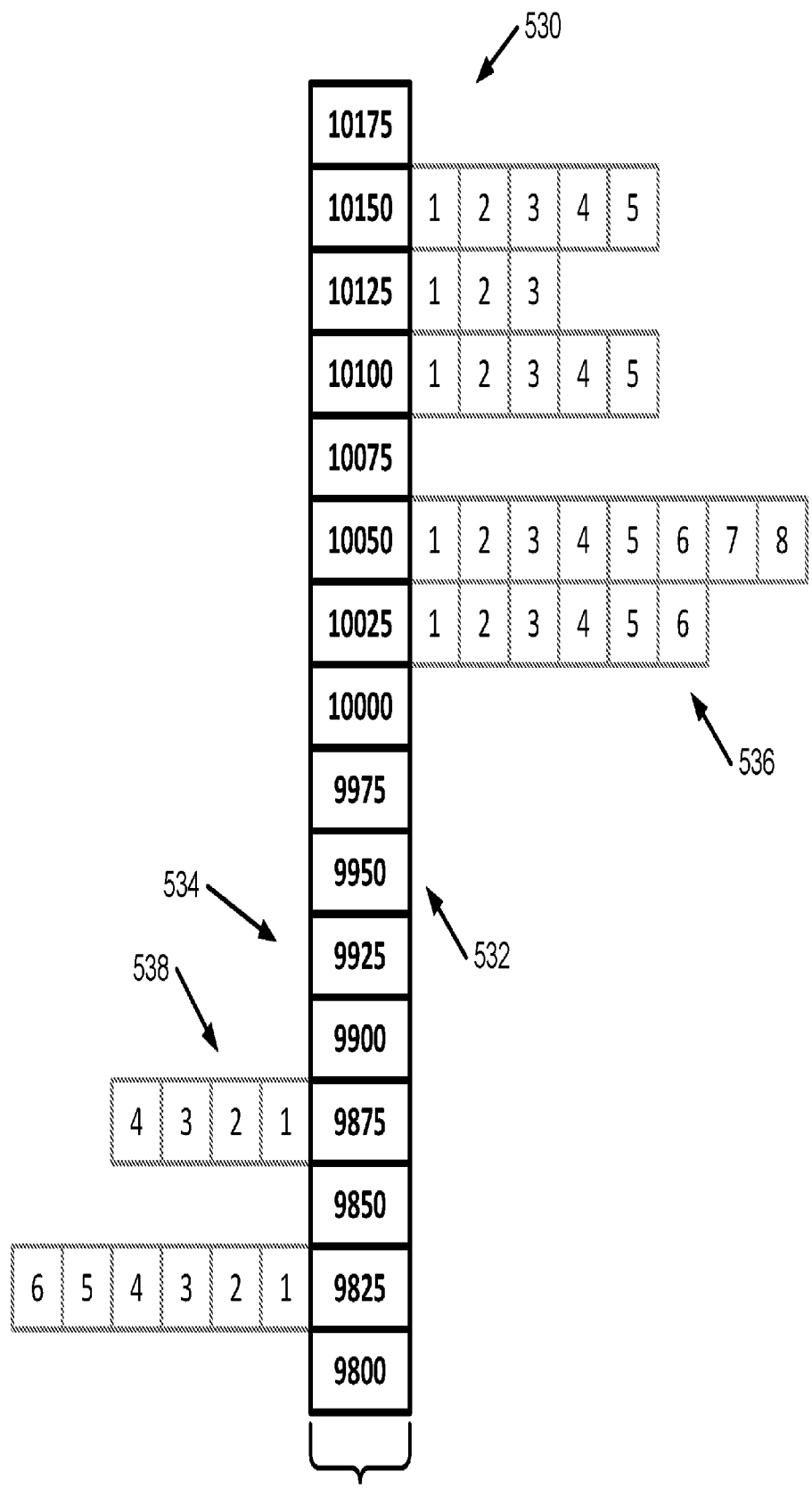

FIG. 5H illustrates the interface 530 at the fourth point in time occurring after the working order has received a complete fill. After receiving one or more market updates, the market data may reflect that the working order has received a complete fill. The order queue 532 corresponding to the price of "9950", at which the quantity of the working order was previously resting, includes an asking quantity of zero (0) tradeable objects. The order queue 534 corresponding to the price of "9925", at which the highest bid available bid was previously resting, has been updated to show a bid quantity of zero (0) tradeable objects. An order queue 538 corresponding to the price of "9875" may reflect the updated highest available bid. An order queue 536 corresponding to the price of "10025" may reflect the updated lowest available ask. As the working order has received a complete fill, the ending time for filling the working order may be reset (e.g., to null). The synthetic strategy engine may stop processing the working order according to the pay-up parameter values, as the working order has received a complete fill.

As shown in FIGS. 5A-5H, working orders may be updated according to the defined pay-up parameter values in an attempt to receive a complete fill. Though the examples provided in FIGS. 5A-5H show an asking quantity decreasing in the corresponding price value defined in the pay-up amount, a bid quantity may similarly increase in the corresponding price value defined in the pay-up amount. The quantity of the working order may continue to increase or decrease by the pay-up amount until a complete fill is received, or the ending time is reached.

Though the examples provided in FIGS. 5A-5H show the quantity of the working order being completely filled as a result of the working order being updated according to the pay-up parameters, the order quantity may not be completely filled prior to the defined ending time for the trade order. The synthetic strategy engine may monitor the current time with respect to the ending time and, if the working order is not completely filled by the ending time, the price of the working order may be changed to a price value having an available contra-side order quantity for which the working order can receive a complete fill. In another example, the synthetic strategy engine may spread the quantity of the working order across a number of the highest available bid prices, or a number of the lowest available ask prices, that have a cumulative quantity available for a complete fill.

Figure 6:
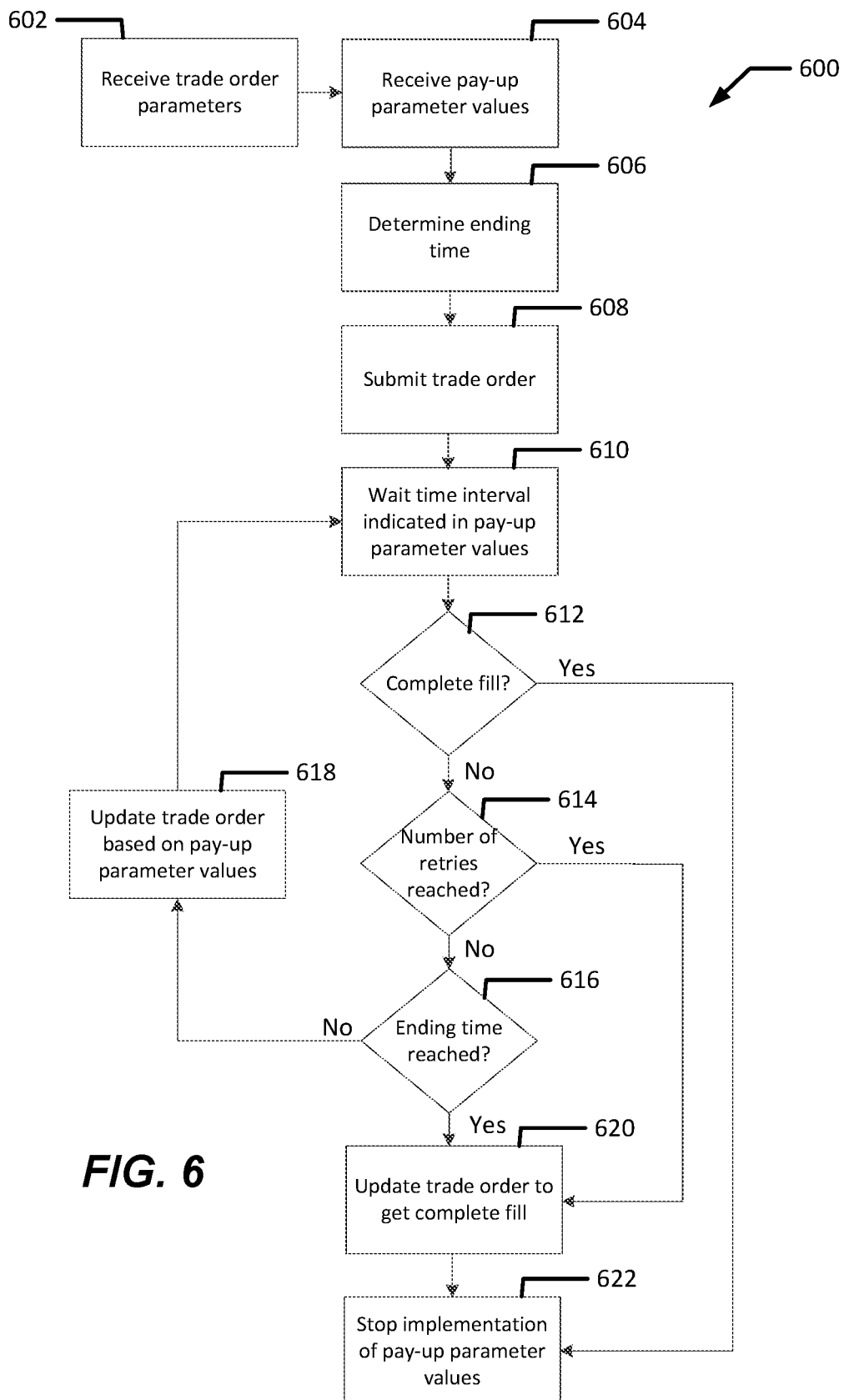
FIG. 6 illustrates an example method for implementing certain embodiments described herein.

FIG. 6 is a flow diagram of an example method 600 for updating a trade order according to defined values of pay-up parameters. The method 600, or portions thereof, may be implemented by a synthetic strategy engine, a trading device, or a combination thereof. The method 600, or portions thereof, may be performed on a single device, or distributed across multiple devices.

As shown in FIG. 6, parameters of a trade order may be received at 602. For example, the order price, order quantity, and/or order type (e.g., bid or ask) may be received at a synthetic strategy engine. Pay-up parameter values may also be received at 604. The pay-up parameter values may include a pay-up interval value, a pay-up counter value, a pay-up amount value, an ending time parameter value, or a combination thereof. At 606, an ending time for implementing the pay-up parameter values may be determined. The ending time may be determined from the pay-up parameter values received at 604. Where the pay-up parameter values include an ending time parameter value, the ending time parameter value may be used. The ending time may also, or alternatively, be calculated from the pay-up interval value and the pay-up counter value. For example, the pay-up interval value may be multiplied by the pay-up counter value to determine the ending time for implementing the pay-up parameter values.

A trade order may be submitted at 608. The trade order may be submitted according to the trade order parameters received at 602. At 610, the synthetic strategy engine may wait the time interval defined by the pay-up interval value. The wait may be initiated upon submission of the trade order 608, or at another time (e.g., upon receipt of an indication to initiate the pay-up parameter values from a trading interface).

After waiting the time interval defined in the pay-up interval value, a determination may be made, at 612, whether the working order has received a complete fill of the order quantity. A complete fill may be determined from market data received from the electronic exchange. The complete fill may be a result of the market moving toward the resting working order during a time interval defined by the pay-up interval value. If the working order is determined, at 612, to be completely filled, the method 600 may stop implementation of the pay-up parameter values at 622.

If the working order is determined not to be completely filled at 612, a determination may be made, at 614, as to whether the number of retries has been reached for attempting to completely fill the quantity of the working order. The number of retries may be counted by a pay-up counter. The pay-up counter may be set to the pay-up counter value and the pay-up counter may decrement each time a working order changes in price in an attempt to receive a complete fill. In another example, the pay-up counter may be incremented from a value (e.g., zero) each time a working order changes in price in an attempt to receive a complete fill. Thus, the pay-up counter may reflect the number of changes in the price of the working order. The number of retries may be reached when the pay-up counter has incremented or decremented the number of times defined in the pay-up counter value.

If it is determined, at 614, that the number of retries has not been reached, a determination may be made as to whether the ending time has been reached at 616. The determination at 614 and 616 may be a single determination, e.g., if the number of retries is used to calculate the ending time. In another example, the number of retries and the ending time may be separate determinations based on separate pay-up parameters. If it is determined that the ending time has not been reached at 616 and/or the number of retries has not been reached at 614, the trade order may be updated according to the pay-up parameter values at 618. For example, the price of the working order may be increased or decreased toward the market in an attempt to fill the quantity of the working order. The increase or decrease in price may be according to the defined pay-up amount value. After the trade order is updated, at 618, the method 600 may proceed to 610 and the synthetic strategy engine may wait the time interval defined by the pay-up interval value before proceeding through the method 600 as described herein.

If the number of retries is determined to be reached, at 614, and/or the ending time is determined to be reached, at 616, the trade order may be updated to receive a complete fill of the working order at 620. For example, the price of the working order may be set to a price at which the quantity of the working order may receive a complete fill. After the working order receives a complete fill, the synthetic strategy engine may stop implementation of the pay-up parameter values at 622.

The method 600 may be implemented to obtain a complete fill of a working order, while mitigating any loss in value that may be caused by increasing or reducing the price of the working order to obtain the complete fill. The defined pay-up parameters may allow a user to exit the market over a period of time, while making attempts at receiving a complete fill at different values to help mitigate any losses that may be caused by exiting the market. This gives the user an opportunity to allow the market to increase or decrease toward the resting value of a working order during pay-up intervals.

In another example, the synthetic strategy engine may receive an ending time and may begin to implement the pay-up parameter values after the ending time. For example, after the ending time, the synthetic strategy engine may increase or decrease the value of the working order according to the defined pay-up amount at the end of each defined pay-up interval.

The pay-up parameters may also be implemented for time sliced orders. The time sliced order may include order parameters having a total quantity, a quantity for being submitted in each child order of the parent order to be sliced in increments of time, and a slicer time interval at which each child order will be submitted. In an example, the total quantity of a parent order may be set to fifteen (15) bids, the quantity for being submitted in each child order may be set to five (5) bids, and the slicer time interval at which each child order will be submitted may be set to ten (10) seconds. The time sliced order parameters may be set to a default and/or may be defined by a user in a trading interface, such as the trading interface 402.

Pay-up parameter values may be defined for the time sliced order. The pay-up parameters may be implemented on each child order of the parent order for which the pay-up parameter values may be defined. For example, using the defined order parameters for the time sliced order above, the pay-up interval may be defined as a one (1) second interval, the pay-up counter may be defined at three (3) retries, and the pay-up amount may be defined at one (1) tick.

After the first child order is submitted at a quantity of five (5) bids, the synthetic strategy engine may wait the slicer time interval of ten (10) seconds to begin implementing the pay-up parameters on the first child order. After the slicer time interval has expired, the synthetic strategy engine may submit a second child order at the indicated price having a quantity of five (5) bids. At the expiration of the time slicer interval, the synthetic strategy engine may proceed through the steps 610-622, of the method 600 shown in FIG. 6, for the first child order. In another example, the synthetic strategy engine may proceed through the steps 612-622, of the method 600 shown in FIG. 6, for the first child order at the end of the time slicer interval. For example, the synthetic strategy engine may determine whether the first child order has received a complete fill at 612, whether the number of retries has been reached for the first child order at 614, and/or whether an ending time has been reached for the first child order, or the parent order, at 616. If none of these determinations prevent the implementation of the pay-up parameter values, the first child order may be updated according to the pay-up parameters at 618. For example, the value of the bid for the first child order may be increased by one (1) tick and the first child order may rest during the pay-up interval defined as a one (1) second interval. The first child order may continue through steps 612-622 of the method 600 until a complete fill of the child order is received.

After the slicer time interval has expired for the second child order, the synthetic order engine may submit a third child order. The synthetic order engine may implement the pay-up parameter values on the second child order, after the time slicer interval has expired for the second child order, in a similar manner as described above for the first child order at the expiration of the time slicer interval for the first child order. Similarly, the synthetic order engine may implement the pay-up parameter values on the third child order, after the time slicer interval has expired for the third child order, in a similar manner as described above for the first and second child orders at the expiration of the time slicer interval for the first and second child orders. As the time slicer interval may expire for multiple child orders within a similar time period, the synthetic order engine may be implementing the pay-up parameters for multiple orders during the same period of time.

Figure 7:
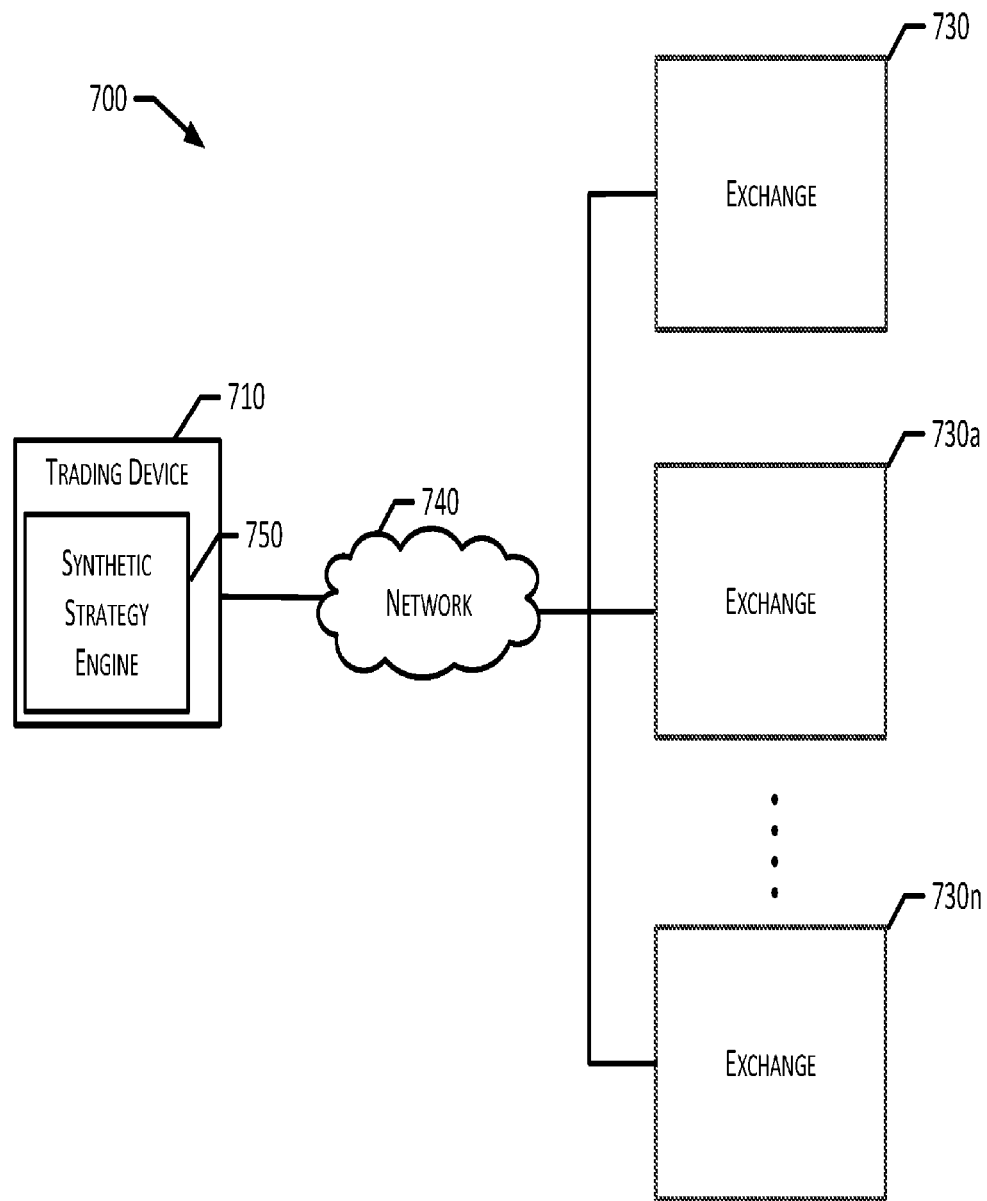
FIG. 7 illustrates a block diagram representative of an example electronic trading system in which certain embodiments may be employed.

FIG. 7 illustrates a block diagram of another example electronic trading system 700 in which certain embodiments may be employed. In this example system, a trading device 710 may utilize one or more communication networks to communicate with one or more electronic exchanges 730, 730a, 730n. For example, the trading device 710 may utilize network 740 to communicate with the exchanges 730, 730a, 730n.

The trading device 710 may comprise one or more devices. For example, the trading device 710 may be a trading terminal, a trading server, a group of trading terminals, a group of trading servers, or a combination thereof. The trading device 710 may include, or be otherwise in communication with, a synthetic strategy engine 750. The synthetic strategy engine 750 may comprise computer hardware and/or software. For example, the synthetic strategy engine 750 may be part of the trading device 710 or may be a stand-alone computing device capable of implementing the embodiments described herein, or portions thereof.

The embodiments described herein may be implemented, in whole or in part, by the synthetic strategy engine 750. For example, the synthetic strategy engine 750 may receive order parameter values and generate trade orders according to the order parameter values for being submitted to electronic exchanges 730, 730a, 730n. The synthetic strategy engine 750 may receive pay-up parameter values, define the pay-up parameters based on the pay-up parameter values, and/or generate trade orders, or updates to trade orders, according to the pay-up parameter values. The synthetic strategy engine 750 may generate the trading interfaces described herein, or may receive information from and provide information to the devices generating the trading interfaces. The synthetic strategy engine 750 may access storage (e.g., locally or at the trading device 710) for storing information to, or retrieving information from, the storage for operating as described herein. The synthetic strategy engine 750 may receive market data from the electronic exchanges 730, 750a, 730n.

The embodiments described herein may be performed on a single device, or be distributed across multiple devices. For example, the synthetic strategy engine 750 may reside at a single trading device 710 or be distributed across multiple devices. The synthetic strategy engine 750 may operate locally on a computing device for generating the display or on a remote computing device capable of providing a display, or information for generating the display, at a local computing device. For example, the synthetic strategy engine 750 may be located at a remote server and generate trade orders, updates to trade orders, and/or information for being displayed via a local application (e.g., a web browser) operating at the trading device 710.

Some of the described figures depict example block diagrams, systems, and/or flow diagrams representative of methods that may be used to implement all or part of certain embodiments. One or more of the components, elements, blocks, and/or functionality of the example block diagrams, systems, and/or flow diagrams may be implemented alone or in combination in hardware, firmware, discrete logic, as a set of computer readable instructions stored on a tangible computer readable medium, and/or any combinations thereof, for example.

The example block diagrams, systems, and/or flow diagrams may be implemented using any combination of application specific integrated circuit(s) (ASIC(s)), programmable logic device(s) (PLD(s)), field programmable logic device(s) (FPLD(s)), discrete logic, hardware, and/or firmware, for example. Also, some or all of the example methods may be implemented manually or in combination with the foregoing techniques, for example.

The example block diagrams, systems, and/or flow diagrams may be performed using one or more processors, controllers, and/or other processing devices, for example. For example, the examples may be implemented using coded instructions, for example, computer readable instructions, stored on a tangible computer readable medium. A tangible computer readable medium may include various types of volatile and non-volatile storage media, including, for example, random access memory (RAM), read-only memory (ROM), programmable read-only memory (PROM), electrically programmable read-only memory (EPROM), electrically erasable read-only memory (EEPROM), flash memory, a hard disk drive, optical media, magnetic tape, a file server, any other tangible data storage device, or any combination thereof. The tangible computer readable medium is non-transitory.

Further, although the example block diagrams, systems, and/or flow diagrams are described above with reference to the figures, other implementations may be employed. For example, the order of execution of the components, elements, blocks, and/or functionality may be changed and/or some of the components, elements, blocks, and/or functionality described may be changed, eliminated, sub-divided, or combined. Additionally, any or all of the components, elements, blocks, and/or functionality may be performed sequentially and/or in parallel by, for example, separate processing threads, processors, devices, discrete logic, and/or circuits.

While embodiments have been disclosed, various changes may be made and equivalents may be substituted. In addition, many modifications may be made to adapt a particular situation or material. Therefore, it is intended that the disclosed technology not be limited to the particular embodiments disclosed, but will include all embodiments falling within the scope of the appended claims.

What is claimed is:

1. A method comprising:
    receiving, at a trading device displaying a trading interface, an order message including an order price, an order quantity and a plurality of pay-up parameters, wherein the plurality of pay-up parameters includes a pay-up interval that indicates a time interval to wait prior to an increase or decrease in the order price when at least a portion of the order quantity is unfilled at an electronic exchange, and an ending time by which the order message is to be filled;
    submitting, by the trading device in communication with a network, the order message to the electronic exchange at the order price, wherein the electronic exchange is in communication with the network;
    determine, by a processor implemented as part of the trading device, based on market data provided by the electronic exchange, that at least a portion of the order quantity is unfilled after the ending time is detected;
    in response to the detection of the ending time, by the processor implemented as part of the trading device, changing the order price according to a pay-up amount included in the plurality of pay-up parameters, wherein the pay-up amount indicates an amount to increase or decrease the order price after each of the pay-up intervals which lapses without receiving a complete fill of the order quantity;
    updating a pay-up counter defined as part of the plurality of pay-up parameters, wherein the pay-up counter is decremented to reflect the change in the order price; and
    submitting, by the trading device in communication with the network, an update to the order message to the electronic exchange, wherein the update includes the change in order price according to the pay-up amount.

2. The method of claim 1, wherein the order message includes a child order of a plurality of child orders submitted to the electronic exchange at time slicer intervals, and wherein the order quantity of the child order is a portion of a total order quantity for a parent order associated with the plurality of child orders.

3. The method of claim 1 further including:
    determining from the market data provided by the electronic exchange, that at least a second portion of the order quantity is unfilled after the ending time is detected;
    determine that the pay-up counter is unexpired;
    determine that a current time is less than the ending time; and
    update the order message pending at the electronic exchange to change the order price according to the value of the pay-up amount.

4. The method of claim 1 further including:
    determining from the market data received from the electronic exchange, that at least another portion of the order quantity is unfilled after the ending time expires; and
    update the order price to cross the market to receive a complete fill of the unfilled order quantity.

5. The method of claim 1 further including:
    prior to the ending time, continuing to change the order price according to the value of the pay-up amount each time a pay-up interval expires.

6. The method of claim 1 further including:
    receiving an indication of a user action to begin a pay-up interval after the order message has already been submitted to the electronic exchange.

7. The method of claim 1, wherein the ending time is calculated from the value of the pay-up interval and the value of the pay-up counter.

8. The method of claim 1, wherein the plurality of pay-up parameters include the ending time.

* * * * *